(12) United States Patent
Kuutti et al.

(10) Patent No.: US 10,042,164 B2
(45) Date of Patent: Aug. 7, 2018

(54) SELF CONTAINED BREATHING APPARATUS (SCBA) ELECTRONICS SYSTEM

(71) Applicant: HUDstar Systems, Inc., West Palm Beach, FL (US)

(72) Inventors: Tommi Lennart Kuutti, West Palm Beach, FL (US); Jeffrey Acton Barnitz, Boca Raton, FL (US); Clayton Joseph Emery, Davie, FL (US); Eugene Victor Horanoff, Jupiter, FL (US)

(73) Assignee: HUDstar Systems, Inc., West Palm Beach, FL (US)

( * ) Notice: Subject to any disclaimer, the term of this patent is extended or adjusted under 35 U.S.C. 154(b) by 0 days.

(21) Appl. No.: 14/741,574

(22) Filed: Jun. 17, 2015

(65) Prior Publication Data
US 2015/0273248 A1    Oct. 1, 2015

Related U.S. Application Data

(63) Continuation-in-part of application No. 14/214,392, filed on Mar. 14, 2014.

(60) Provisional application No. 61/799,858, filed on Mar. 15, 2013.

(51) Int. Cl.
*H04N 5/33* (2006.01)
*G02B 27/01* (2006.01)
*A62B 18/02* (2006.01)
*A62B 9/00* (2006.01)

(52) U.S. Cl.
CPC .......... *G02B 27/0172* (2013.01); *A62B 9/00* (2013.01); *A62B 9/006* (2013.01); *A62B 18/02* (2013.01)

(58) Field of Classification Search
CPC .. G08B 25/016; G08B 21/0453; G08B 17/00; G08B 25/10; G08B 21/0446; G08B 25/009; G02B 27/017; A61B 5/0022; A61B 5/1112; A61B 5/0002; A61B 5/02438; A62B 9/006
See application file for complete search history.

(56) References Cited

U.S. PATENT DOCUMENTS

| | | | |
|---|---|---|---|
| 5,640,079 A | 6/1997 | Nelson et al. |
| 5,645,260 A | 7/1997 | Falangas |
| 5,751,217 A | 5/1998 | Kchao et al. |
| 5,941,915 A | 8/1999 | Federle et al. |
| 6,160,389 A | 12/2000 | Watts |

(Continued)

FOREIGN PATENT DOCUMENTS

WO    WO2014152746    9/2014

*Primary Examiner* — Farhan Mahmud
(74) *Attorney, Agent, or Firm* — McHale & Slavin, P.A.

(57) ABSTRACT

A self contained breathing apparatus electronics system that provides a method for maximizing battery life, estimating remaining battery life and condition, insuring reliable communications between modules, maintaining reliable real-time clock (RTC), minimizing piezo interference, minimizing effects of RFI and EMI on pressure measurement, retaining consistency in the motion detection circuitry due to sensitivity to temperature changes, and provides an SCBA facemask-mounted Thermal Imaging Camera (TIC) Module and a Heads-Up Display (HUD) Module mounted inside an SCBA facemask, in one of several embodiments.

19 Claims, 39 Drawing Sheets

(56) References Cited

U.S. PATENT DOCUMENTS

| | | | |
|---|---|---|---|
| 6,456,261 B1* | 9/2002 | Zhang | A42B 3/042 |
| | | | 345/7 |
| 7,038,639 B1* | 5/2006 | Olstad | B63C 11/12 |
| | | | 345/8 |
| 7,262,747 B2 | 8/2007 | Ebersole et al. | |
| 2005/0121031 A1 | 6/2005 | Ebersole, Jr. | |
| 2006/0121993 A1* | 6/2006 | Scales | A63F 13/10 |
| | | | 463/48 |
| 2006/0216011 A1 | 9/2006 | Godehn | |
| 2007/0229356 A1 | 10/2007 | Kodrin | |
| 2009/0230934 A1 | 9/2009 | Hooijschuur et al. | |
| 2013/0242110 A1 | 9/2013 | Terre et al. | |
| 2014/0071294 A1 | 3/2014 | Lavoie | |

* cited by examiner

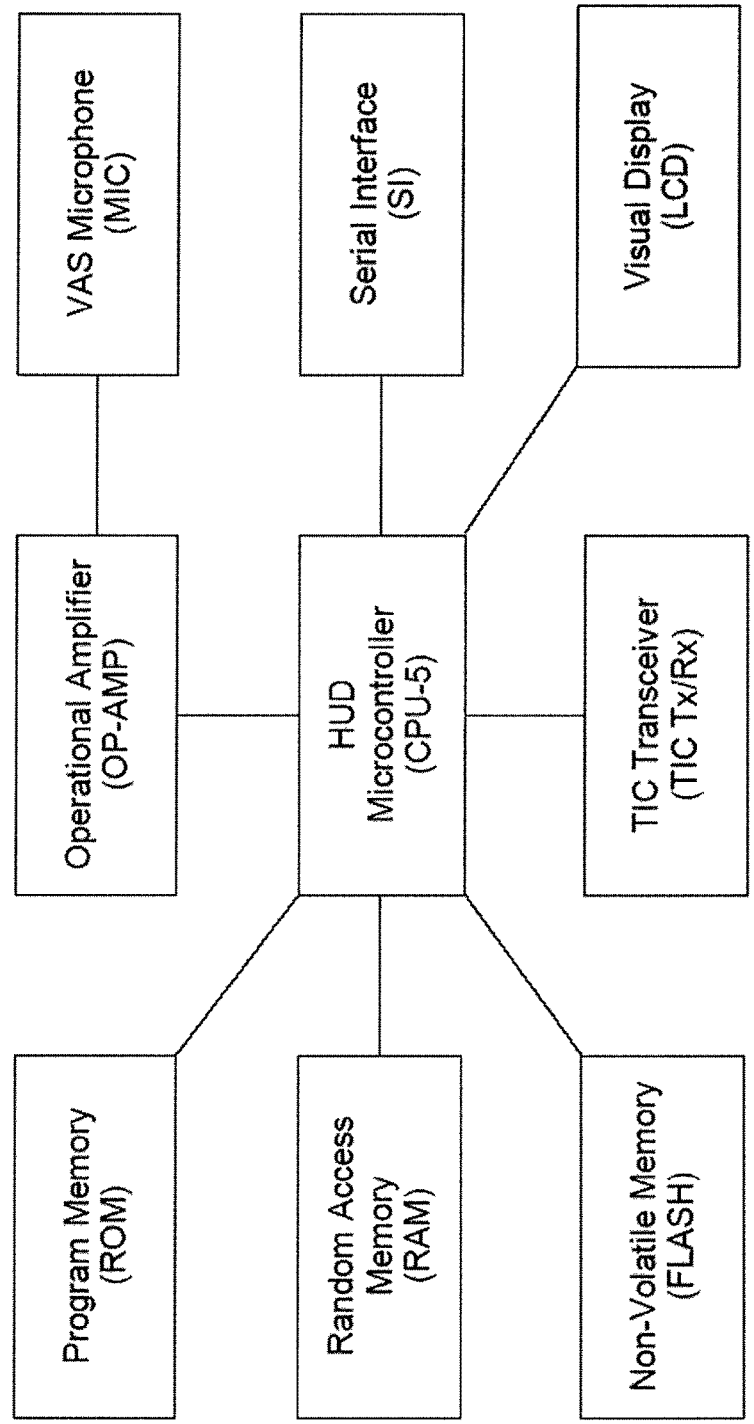

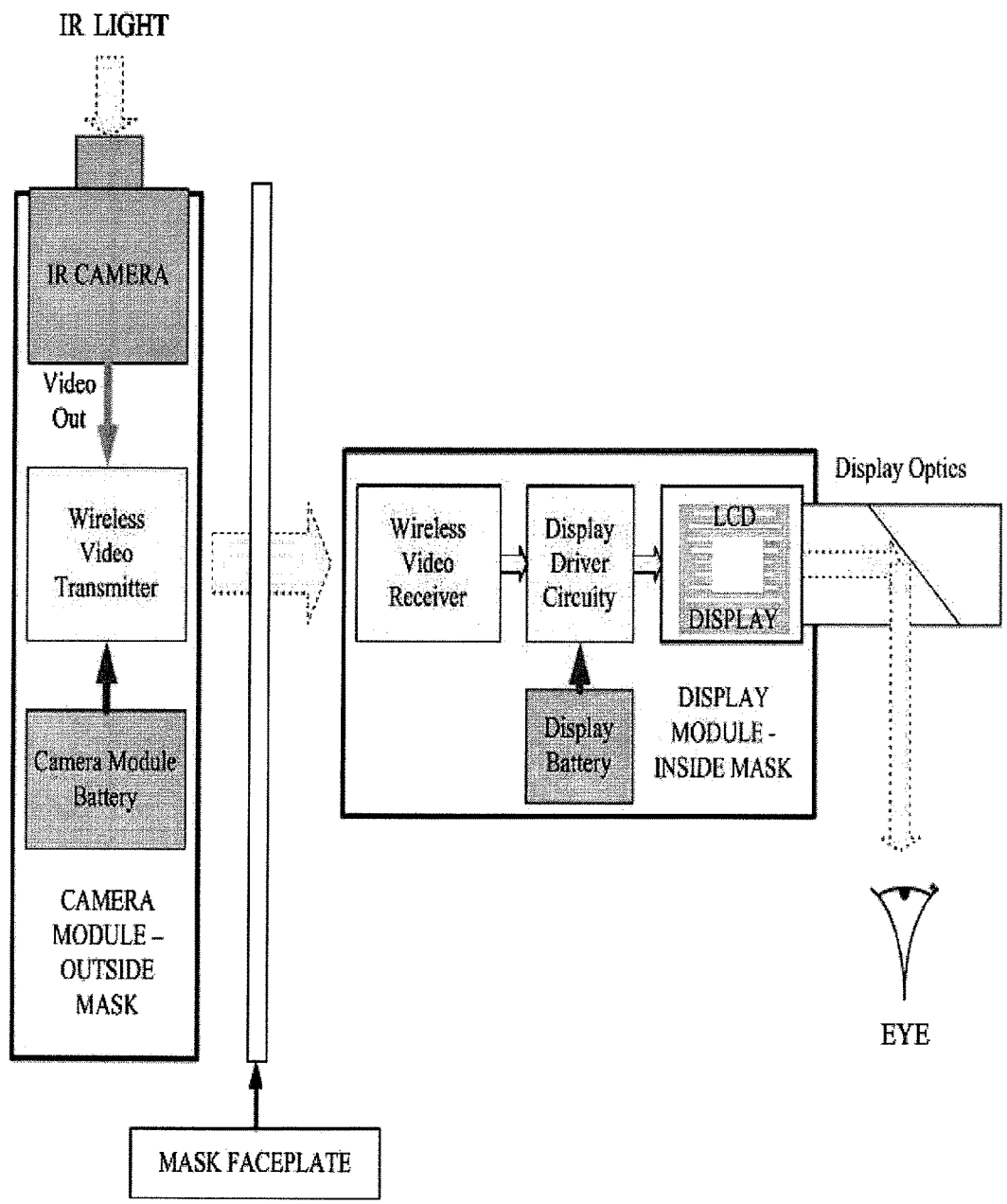
Figure 14A – Block Diagram of the wireless version of the TIC-HUD with a 'see-through' reflector

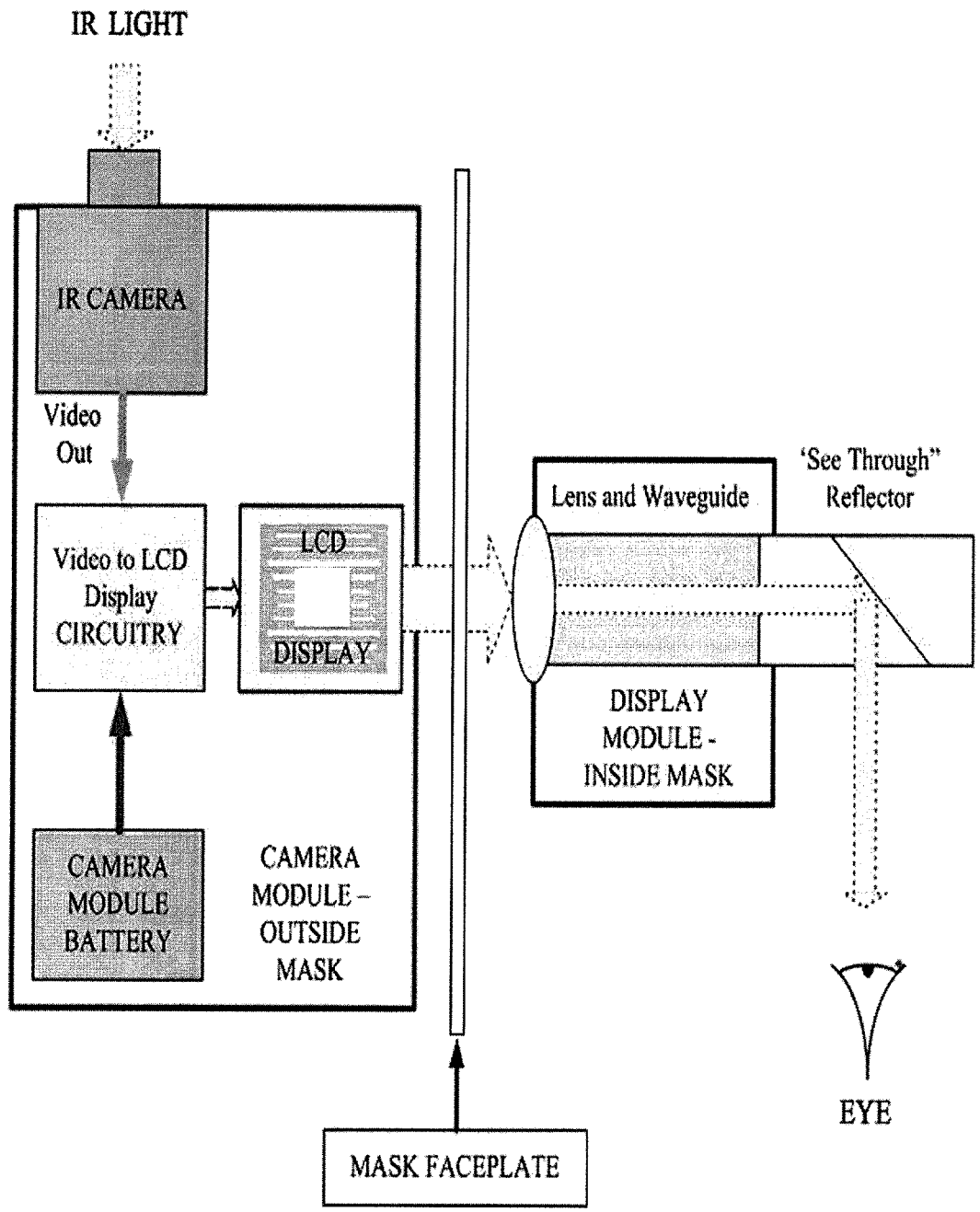
Figure 15A – Block Diagram of the Passive Optical Display (POD) with a 'see-through' reflector

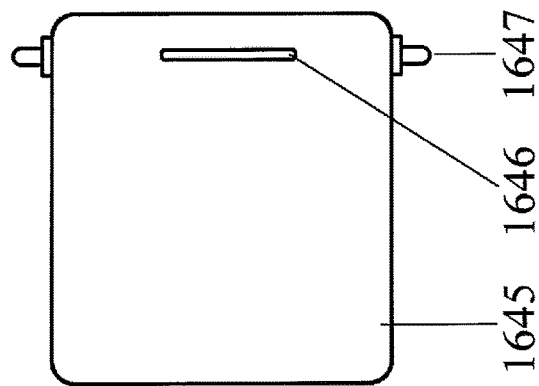
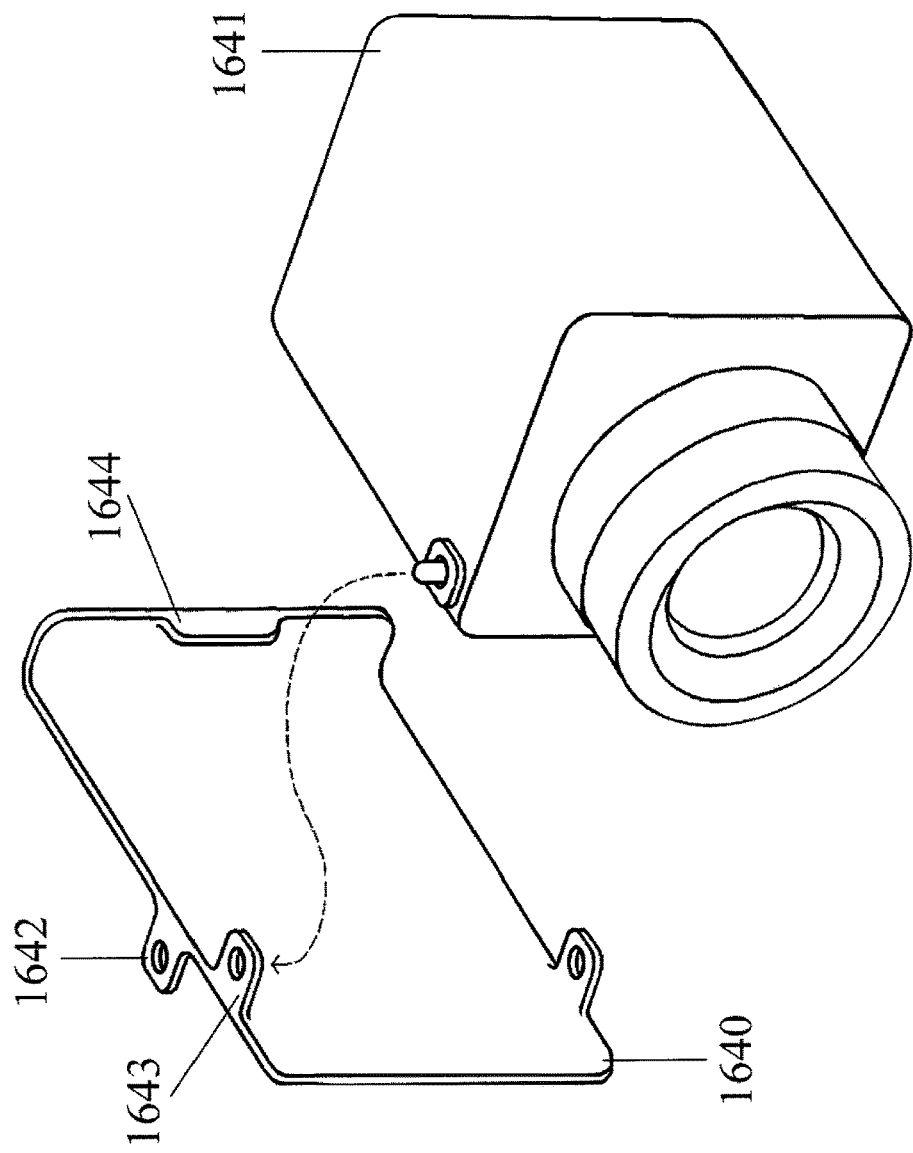

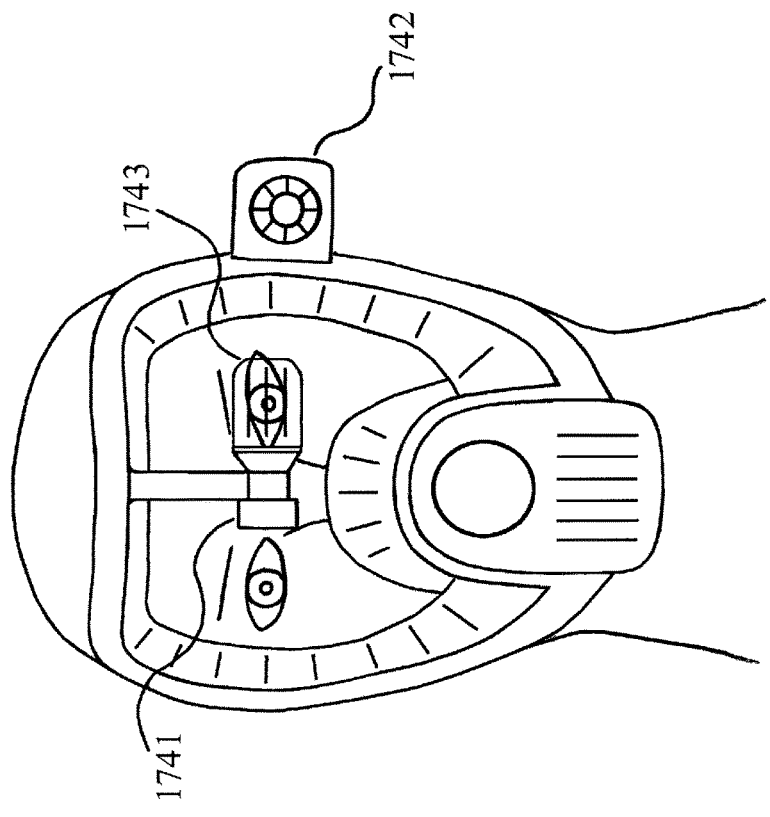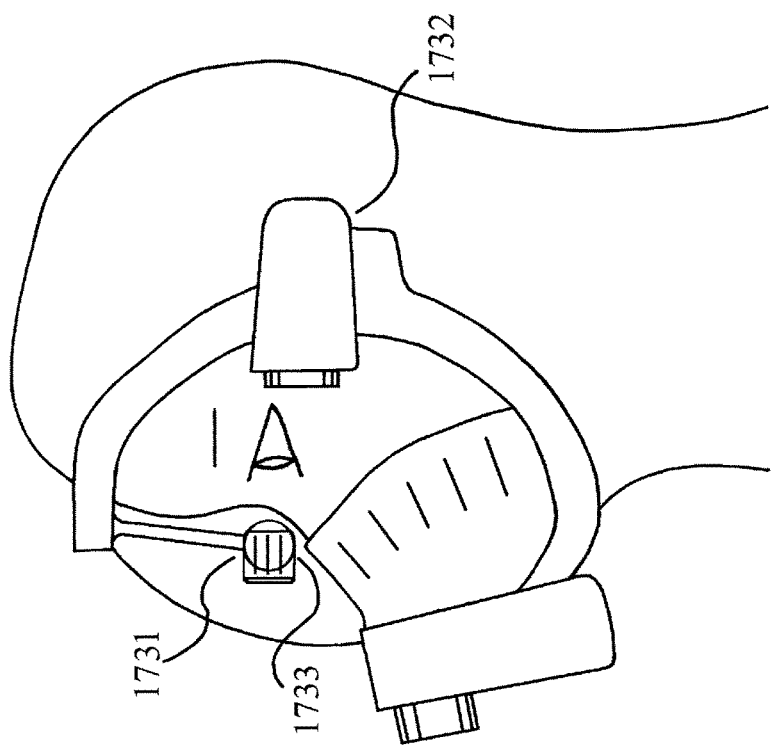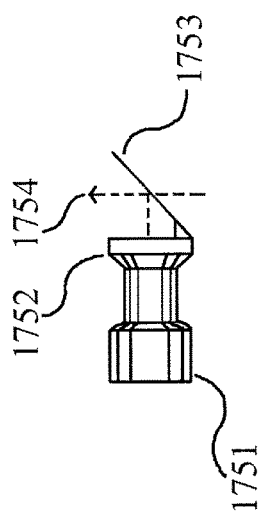

Incident Commander Display

SELF CONTAINED BREATHING APPARATUS (SCBA) ELECTRONICS SYSTEM

PRIORITY CLAIM

In accordance with 37 C.F.R. 1.76, a claim of priority is included in an Application Data Sheet filed concurrently herewith. Accordingly, the present application claims priority as a continuation-in-part of U.S. patent application Ser. No. 14/214,392, filed Mar. 14, 2014, which further claims the priority of U.S. Provisional Patent Application 61/799,858, filed Mar. 15, 2013, and entitled Self Contained Breathing Apparatus (SCBA) Electronics System, the contents of which is incorporated herein by reference.

FIELD OF THE INVENTION

This invention relates generally to the breathing apparatus field and, in particular, to an improved battery powered self contained breathing apparatus (SCBA) Electronics System for use by firefighters and other rescue personnel capable of extending battery life and providing a Thermal Imaging Camera-Heads-Up Display (TIC-HUD) with the TIC Module mounted externally on an SCBA facemask, the HUD Module mounted inside the SCBA facemask, a means for transferring images from the TIC Module to the HUD Module, a means for connecting the TIC-HUD to the central SCBA electronics system, a means for the transmission/reception of sensor readings and telemetry data, a means for superimposing sensor readings and/or telemetry data over the image transferred from the TIC Module, and a means for transmitting images or video via the SCBA's telemetry system to or from the fire officer or Incident Commander on the outside of the fire.

BACKGROUND OF THE INVENTION

Self contained breathing apparatus, or SCBA, is a device worn by firefighters and rescue personnel to provide breathable air in an immediate danger to life and health situation. A SCBA typically has four main components: a high-pressure tank, a pressure regulator, an inhalation connection and an electronics system, all affixed together and mounted onto a carrying frame. SCBA's are one of the most important items of personal protective equipment used by firefighters and rescue personal. SCBA's allow firefighters to enter hazardous environments to perform essential interior operations including offensive fire attacks, victim search, rescue and removal, ventilation, and overhaul. They are also used at non-fire incidents involving hazardous material and confined spaces where there is a threat of toxic fumes or an oxygen-deficient atmosphere. A SCBA may fall into one of two different categories: an open circuit or a closed circuit SCBA.

SCBA systems used in firefighting places an emphasis on quality of materials required for heat and flame resistance above that of manufacturing cost. SCBA systems tend to be expensive because of the exotic materials used to provide heat and flame resistance and, to a lesser extent, to reduce the weight penalty on the firefighter. In addition, modern SCBA's incorporate a PASS (Personal Alert Safety System) device or an ADSU (Automatic Distress Signal Unit) into their design. These units emit distinctive high pitched alarm tones to help locate firefighters in distress following automatic activation if movement on the part of the firefighter is not sensed for a certain length of time. In addition to the PASS and ADSU units, SCBA's have been equipped with a Black Box for data logging, microphones for in-mask firefighter to firefighter communication, a telemetry system, and thermal imaging cameras to help the firefighter see through the smoke.

There have been several documented incidents where a SCBA failure may have been a contributing factor in the deaths of or injuries to firefighters. These incidents, coupled with a recognition of the importance of self contained breathing apparatus safety, prompted the U.S. Fire Administration to undertake various studies to address the many operational trends associated with SCBA failure incidents and to identify potential problems requiring correction or standardization. Equipment of such importance warrants close scrutiny. How much change is necessary and to what extent it will help a fire service must be asked. Standards and testing procedures have been changed over time to address problems that led to equipment failures and to ensure that SCBA's are more durable and reliable. As regular inspection, upgrade, and preventive maintenance will lessen the potential for catastrophic failures of a SCBA, standards for such were established in the National Fire Protection Association (NFPA) 1981 specification and NFPA 1982 specification, 2013 edition.

There have been several issues and operational failures that are frequently identified in SCBA maintenance and user training manuals and exercises. One of the most common is the failure to use the SCBA system correctly. Even with current emphasis on firefighter health and safety, and the expanding knowledge of the hazard posed by the products of combustion, some firefighters still fail to use SCBA during interior operations in smoke filled environments, especially during cases of salvage and overhaul. Injuries or even death can thus be avoided by continuing to educate firefighters about the risk involved from failure to use a SCBA. As a result, creating an easy to use, comfortable, and cost-efficient SCBA system is a very important consideration for manufacturers.

Another concern is hardware reliability, including battery failure. SCBA's are to be tested and certified according to the requirements set forth by the NFPA 1981 specification, entitled the Standard for Open Circuit Self Contained Breathing Apparatus. This ensures that SCBA's are extremely durable and rugged. If the SCBA is properly used and maintained by well-trained personnel, it should provide years of trouble-free service with little potential for hardware failure. However, battery failure is an all-to-common occurrence and the NFPA has required specific protocols, such as the PASS and ADSU (discussed above), to help prevent such failures. Lastly, some failures of the SCBA system may not directly result in death or injury, but may reduce efficiency and hamper firefighter performance. This type of failure is relatively common and most often attributable to operator error, physical abuse/neglect to the system, or inadequate preventive maintenance procedures. Examples include: difficult or slow donning of SCBA due to lack of familiarity or infrequent practice; free flowing regulators; O-rings blown out during cylinder changes; and improperly connected hoses or regulators. Below are some specific SCBA system failures not yet addressed.

On the average in the United States, most fire departments use their SCBA less than one-half hour per day. Thus for more than 23 hours per day, the SCBA is typically left dormant. When firefighters respond to a call time is of the essence, adrenaline is flowing, and tensions are high. With this fully understood, NFPA does not permit SCBA equipment to be equipped with an ON/OFF switch. Instead some automated detection means must be employed. Presently, most SCBA systems include a microcontroller that is programmed to monitor the air tank pressure during periods when the SCBA is inactive. With this the SCBA system can be made to turn on automatically within a few seconds after the air tank valve is opened and an increase in pressure is detected. Unfortunately, to save battery life, most SCBA systems program the microcontroller to enter a Sleep Mode function during periods of inactivity, typically scheduling it to wake up every few seconds to check air tank pressure. This method causes the Sleep Mode function to consume approximately 40% of the total SCBA battery life, which can lead to battery failure and possible malfunction during use, thereby compromising firefighter safety.

Additionally, under low voltage battery conditions the SCBA electronics operation can malfunction. NFPA electronics requirements demand that SCBA electronics determine the capacity of the SCBA battery power supply and report if it is insufficient for proper use. NFPA requires that the SCBA warn the firefighter of a low battery condition no later than when the batteries can provide just enough energy for the SCBA to function continuously for 2 hours in 'Alarm Mode'. In order to maintain safe operation, it is important to be able to determine the condition or 'health' of the batteries, to be able to estimate the remaining battery life in 'Alarm Mode', and to provide a 'Change Battery' warning at the appropriate time. A test battery load current and battery load voltage measurement is employed to predict the remaining power reserves in the SCBA equipment. The battery test load current must be similar to the actual SCBA battery load. The traditional test for battery condition employs a fixed battery load resistor turned on and off by the circuit, while measuring the SCBA battery voltage change resulting from current draw. Using derived unit of electrical resistance law (ohm), an ohm value of the battery test load resistor must be selected to ensure that the low battery voltage current test load is similar to the actual SCBA load at that voltage. A fixed value battery load resistor with variable battery voltage allows for generation of a battery test load current at high voltage levels that can be unnecessarily excessive. Thus, a power conserving solution which employs a constant current battery test load where no power is wasted at high battery voltage levels would conserve SCBA battery life during battery load testing.

The most common electromagnetic interference (EMI) resistance circuit methods employ shielding, low source impedance and protection devices to mitigate the effects of EMI. The disadvantage of the low source impedance technique is that the amount of power required to protect the circuit increases with protection levels, therefore the lower the impedance of the circuit the greater the EMI protection level and power consumed. Again, battery consumption can be compromised. What is needed is a power conserving EMI circuit that changes the impedance of the circuit from low impedance high protection when the SCBA electronics is sleeping to high impedance low power when awake in order to conserve battery power.

NFPA requires a Black Box with SCBA for data logging, i.e. the SCBA electronics must record and time-stamp alarm conditions and certain other specified events. The data logs provide forensic information in the event of an accident occurring during operation of the SCBA. Clearly, having an accurately recorded time-stamp is important. Existing SCBA systems typically employ a real-time clock (RTC) to provide the time-stamp. The event data and the time-stamp are stored in non-volatile memory. Unfortunately, an RTC failure can cause the time-stamp to be lost, typically rendering the logged data useless for forensic purposes. Currently RTC failure experienced with a SCBA systems results in the time-stamp date being reverted to the RTC "default" date, which is not an accurate representation of the actual time of the event.

NFPA requires that a Personal Alert Safety System (PASS) device enters Pre-Alarm Mode if a firefighter is detected to be motionless for 20 seconds. The PASS piezo emitter must generate an NFPA specified sound in Pre-Alarm Mode. If the firefighter continues to remain motionless for an additional 12 seconds, the PASS must enter Alarm Mode and generate an NFPA specified universal alarm sound for the firefighter and perhaps more particularly for others, to hear continuously thereafter until the PASS piezo is turned OFF manually, indicating that the firefighter has depressed the Reset Button in response to the alert. Most SCBA manufacturers equip their PASS devices with an accelerometer to detect motion and include a piezo emitter and/or a volume acoustic speaker (VAS) in their PASS device housing. Presently, a problem/safety issue can occur when, under certain circumstances, vibrations generated by the piezo or speaker are transmitted through the PASS device housing causing interference with the operation of the accelerometer. Specifically, when the PASS enters Pre-Alarm Mode due to lack of movement for 20 seconds, the piezo commences emitting sound, which causes vibrations. These vibrations are transmitted through the housing and are detected by the accelerometer. The accelerometer sends a signal to the Microcontroller that it is detecting vibrations. The Microcontroller interprets the vibrations as movement by the firefighter, which turns OFF the piezo, and resets the 20-second clock. Unfortunately, this can lead to valuable rescue time being lost should the firefighter be in actual peril and, in a worst case scenario, can lead to possibly deadly consequences.

A major use of SCBA systems is for Search and Rescue (SAR) operations. When firefighters are operating in hazardous environments their vision is often completely obscured by smoke. This greatly limits their ability to locate victims at the scene. The standard procedure under these conditions is for the SAR team to crawl along the floor of the search area using their hands to manually perform the search. They must keep their legs linked together during the search so that they do not lose track of their team members. This is a slow, dangerous and inefficient process. Using a thermal imaging system to view the search area would provide a vast improvement in the search process. With a thermal imaging system obstacles and victims in the search area would be visible regardless of the amount of smoke. The search area could be quickly scanned, greatly reducing the search time and greatly increasing the likelihood that the victim can be saved.

The most commonly available thermal imaging systems are currently handheld units consisting of a thermal imaging camera (TIC) with an integrated display module. These units are a great help in firefighting and SAR operations. However, handheld TIC's have several disadvantages. Thick smoke between the display and the firefighter's facemask can make the display un-viewable. If the firefighter tries to compensate by moving the display up close to his facemask, his eyes may not be able to focus and the display becomes illegible. Since the display is typically the most heat-sensitive part of a handheld TIC, it must be insulated/shielded and constructed with expensive materials that can withstand the extreme temperatures and conditions inside a burning building. Consequently, handheld TIC's are very expensive so most fire departments can only purchase a limited number.

Additionally, handheld TIC's tie up one of the firefighter's hands, which prevents him from doing other important work, such as carrying a victim or holding a firehose and directing water at a fire. These disadvantages limit the usefulness of handheld TIC's in firefighting and SAR operations.

A thermal imaging system with an SCBA facemask-mounted TIC and a display module mounted inside the firefighter's SCBA facemask would be a much more useful system in firefighting and SAR operations. An SCBA facemask-mounted TIC provides several advantages over a handheld unit. Both of the firefighter's hands are freed up for other uses. The scene captured by the TIC automatically displays the area that the firefighter is looking at. Mounting the TIC display module inside the SCBA facemask also has several advantages: the display can never be obscured by smoke; the display is protected from the external environment so it does not need any elaborate, expensive shielding, and it can be positioned so as not to obstruct the firefighter's forward field of view when not in use. Finally, the external TIC mounting bracket can also be designed to allow the TIC to be easily removed so that it could be shared between team members. This would allow flexibly in the assignment of firefighting and/or SAR team members and reduce costs for fire departments. An SCBA facemask-mounted TIC would provide each firefighter with a window through the smoke, to be able to perform his work hands-free, and to more easily locate victims.

One of the most common causes of death of firefighters is the inability to find their way out of a burning building. Firefighters usually perform their work in smoke that is so thick that visibility is virtually non-existent. When entering a building, firefighters will typically choose a left-hand search pattern or right-hand search pattern, feeling their way along the walls. If a firefighter gets separated from his partner, lost, disoriented or on the verge of heat-stroke, an SCBA facemask-mounted TIC would provide him with a window through the smoke, to be able to find his way out of the burning building.

Larger fires have an appointed Rapid Intervention Team (RIT) or Rapid Intervention Crew (RIC). The RIT or RIC typically consists of two or three firefighters whose mission is to rescue downed firefighters, for example, firefighters who are injured or who are trapped inside the fire. Time is of the essence for the RIT team. The team must locate the incapacitated or trapped firefighter before he runs out of air. An SCBA facemask-mounted TIC would enable the RIT team to find their incapacitated or trapped colleague much more quickly, greatly increasing the likelihood that the downed firefighter can be saved.

Recent prior art attempts at mounting a TIC on the firefighter's helmet or on the SCBA facemask have typically incorporated the display into the TIC housing. This method results in a bulkier configuration which can become an entanglement hazard for a firefighter operating in confined spaces. Additionally, whenever the display is external, thick smoke and/or soot collected on the outside of the mask can prevent the firefighter from being able to see the image, thereby negating the usefulness of the device.

The faceplates of SCBA facemasks are designed to shield firefighters by reflecting heat and are therefore not transparent to infrared (IR) light. Recent prior art attempts at mounting a TIC with a projector display inside the SCBA facemask have several drawbacks. The first disadvantage is the requirement of cutting apertures in the front of the facemask to allow the IR radiation to penetrate the shield, then covering the apertures with an IR transmissive material. This compromises the integrity that a continuous facemask provides and will not be considered acceptable by most fire departments and firefighters. Additionally, thermal imaging cameras generate a large amount of heat. Placing the thermal imaging camera inside the SCBA facemask would generate too much heat to be able to be worn by the firefighter for long enough to perform his mission. Also, current thermal imaging camera and projector display technology is too bulky to fit both components inside currently manufactured NFPA-approved SCBA facemasks.

Firefighters depend on the air in their SCBA air tank for life safety. They must always consider the amount of air it will take them to get to the exit of the burning or smoke-filled building, to assure that they do not run out of air, which could be fatal. Therefore, firefighters need to be continuously aware of the exact air tank pressure remaining in their air tank. What is lacking in the prior art is the ability to superimpose air tank pressure and other sensor readings on the HUD image viewed by the firefighter.

The prior art U.S. Pat. No. 7,298,535 Digital Situation Indicator (Kuutti) teaches a HUD that calculates the number of minutes of air time remaining. The instant invention improves upon the Digital Situation Indicator by superimposing the air time remaining onto the image transferred to the HUD Module by the TIC Module and viewed by the firefighter.

Burning buildings can be noisy places. Powerful jets of water are typically being sprayed through hoses, structures may be collapsing, and PASS alarms may be activating. Audio communications may be hampered by these noisy conditions. The instant invention allows the Incident Commander (IC) on the outside of the fire to send vital telemetry communications to the TIC-HUD, which will superimpose text on the HUD image viewed by the firefighter. These telemetry communications can be texts such as 'Evacuate' (EVAC) or Personnel Accountability Report (PAR). They can also be graphic such as the layout of the interior of a warehouse building or manufacturing plant. If a graphic image is transmitted via the telemetry system to the TIC-HUD, the firefighter will be able to view the image on the HUD display. What is lacking in the prior art is the ability to display telemetry communication images on the HUD display, and to superimpose text over the image displayed by the HUD Module and viewed by the firefighter.

In order to lead effectively, the Incident Commander on the outside of the fire needs to know what is going on inside the fire. The instant invention allows firefighters to transmit, through the TIC-HUD connection to the SCBA's telemetry system, thermal images or video taken by the thermal imaging camera. The IC can then make better, more informed decisions. For example, if the thermal images or video transmitted to the IC indicate that the fire is raging out of control, the IC can make the decision to go defensive and order all firefighters to evacuate (EVAC).

The TIC Module of the instant invention, in all embodiments, is mounted to the outside of the SCBA facemask, typically with a snap-in fitting. This allows the TIC Module, which is the most expensive component, to be shared and used by several firefighters on different shifts. Since the facemasks themselves are fit-tested and personal to each firefighter, upon finishing his shift, a firefighter can simply unsnap the TIC Module from his mask and allow the firefighter on the incoming shift to use it.

Thus, what is lacking in the prior art is a self contained breathing apparatus electronics system having sophisticated individual modules to alleviate the potential for such problems and maximizing battery life and providing a TIC-HUD with the TIC Module mounted externally and the HUD Module mounted inside the SCBA facemask, through which the firefighter can view thermal images transferred from the TIC Module, superimposed with sensor readings from the central SCBA electronics system or text communications from the Incident Commander, with an integrated microphone and ambient light sensing technology to automatically change the brightness of the display, with a quick-disconnect means to attach the TIC Module to the SCBA facemask, a means to incorporate audio speech detection circuitry to interpret and perform voice commands by the firefighter, and a means to transmit thermal images or video from the thermal imaging camera to the Incident Commander outside the fire.

SUMMARY OF THE INVENTION

A self contained breathing apparatus (SCBA) electronics system that provides an external, head mounted, thermal imaging camera (TIC) with a heads-up display (HUD) module mounted inside the SCBA facemask, a method for maximizing battery life, estimating remaining battery life and condition, insuring reliable communications between modules, maintaining reliable real-time clock (RTC), minimizing piezo interference, minimizing effects of RFI and EMI on pressure measurement, and remaining consistent in the motion detection circuitry due to sensitivity to temperature changes is provided.

Accordingly, it is an objective of the instant invention to provide a self contained breathing apparatus electronics system that supplies the operator with an indicator of the amount of air in the self contained breathing apparatus's air tank.

It is also an objective of the instant invention to provide a self contained breathing apparatus electronics system that monitors the movement of the operator and emits an alert if the operator goes without motion for a specified time.

It is another objective of the instant invention to provide a self contained breathing apparatus electronics system that logs alert conditions and ambient environmental conditions during operation. This SCBA system also logs a backup time stamp upon each power up and compares dates and time with the real-time clock (RTC).

It is a further objective of the instant invention to provide a self contained breathing apparatus electronics system that during operation presents visual and audio indicators to allow easier tracking of the self contained breathing apparatus in visually obscured environments. The SCBA also makes use of a thermal imaging camera (TIC) that will aid vision in dark and/or line-of-sight impaired conditions. An SCBA facemask-mounted TIC Module will automatically follow the orientation the orientation of the firefighters head showing an enhanced picture of obstacles and persons, whether they be other firefighters or merely individuals in need of assistance. A HUD Module mounted inside the SCBA facemask that communicates using wires or wirelessly with the TIC Module and provides the image from the TIC Module that can be viewed directly through an optical lens systems or, optionally, using a shutter reflector, a beam splitter reflector, or a dual prismatic reflector. It is a further objective of the instant invention to provide a means for transferring sensor readings from the central SCBA electronics system to the TIC-HUD, a means for transferring text communications from the Incident Commander to the TIC-HUD, a means to superimpose such sensor readings and text communications over the image displayed by the HUD and viewed by the firefighter, a means to integrate a microphone into the HUD Module, a means to integrate ambient light sensing technology into the TIC-HUD to automatically change the brightness of the display, a quick-disconnect means to attach the TIC Module to the SCBA facemask, a means to incorporate audio speech detection circuitry to interpret and perform voice commands by the firefighter, and a means to transmit thermal images or video from the thermal imaging camera to the Incident Commander outside the fire.

It is yet a further objective of the instant invention to provide a self contained breathing apparatus electronics system that amplifies the operator's voice to facilitate communications between rescue personnel while the operator is using breathing air.

It is a still further objective of the instant invention to provide a self contained breathing apparatus electronics system that is built to conform to the functional requirements of the NFPA 1981 specification and 1982 specification, 2013 edition. The SCBA of the instant invention will comply with power protection circuitry set forth in Underwriters Laboratories (UL) 913, $6^{th}$ edition.

It is an additional objective of the instant invention to provide a self contained breathing apparatus electronics system that includes an emergency locator transmitter, whereby when activated emits a signal that can be tracked using a matching tracking system.

It is a further objective of the instant invention to provide a self contained breathing apparatus electronics system that also includes an interface to an external radio. When the radio is connected, audio from the radio is routed to the voice amplification system and voice audio from the heads-up display microphone is routed to the radio transmitter.

It is a further objective of the instant invention to provide a self contained breathing apparatus electronics system having a method for maximizing battery life by having the electronics powered by two separate voltage regulators—a high current regulator for Active Mode operation and a low quiescent current regulator for Inactive (Sleep) Mode operation.

It is a further objective of the instant invention to provide a self contained breathing apparatus electronics system having a method for estimating remaining battery life and condition, where, the voltage of the batteries is measured in both unloaded and loaded states, using a temporary load proportional to the estimated maximum load of the SCBA electronics. The battery condition is determined such that, the unloaded voltage (VUL) and loaded voltage (VL) measurements are compared to an unloaded voltage threshold level (VTH-UL) and a loaded voltage threshold level (VTH-L), where the VTH-UL and VTH-L threshold voltages are determined empirically through measurement of the voltage decrease in the SCBA electronics during operation over time. This gives an estimate of the remaining life of the batteries when a threshold voltage is reached and if the measured voltage falls below either threshold level then the 'change battery' indicator is activated.

It is a further objective of the instant invention to provide a self contained breathing apparatus electronics system able to insure reliable communications between modules by implementing a derivative of the IEEE RS-485 communications bus in the circuit design for communication between the various SCBA Electronics Modules.

It is a further objective of the instant invention to provide a self contained breathing apparatus electronics system able to maintain a reliable RTC, by initializing upon power up a backup time-stamp that is maintained by the system clock, the Microcontroller's internal oscillator, which is separate from the RTC clock. The reliable real time clock is maintained by having the Microcontroller compare the date/time provided by the RTC to the most recent time-stamp from the most recently stored data log and, if the Microcontroller determines that the RTC has provided an unrealistic or invalid date/time indicative of RTC failure, then the backup time-stamp is used henceforth in its place It is a further objective of the instant invention to provide a self contained breathing apparatus electronics system having a method for minimizing piezo and Voice Amplification System (VAS) Speaker interference in the Mobile Personal Alert Safety System PASS Module, by utilizing a software algorithm, which is tuned separately for each axis of movement on the XYZ accelerometer to attenuate high frequency vibrations, thereby allowing only low frequency motion to be detected resulting in less interference.

It is a further objective of the instant invention to provide a self contained breathing apparatus electronics system having a method for minimizing effects of electromagnetic interference (EMI) on pressure measurement by utilizing a software algorithm that checks for a constantly increasing air pressure over a period of time in order to verify that the pressure is valid prior to awakening the SCBA electronics.

Other objectives and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

BRIEF DESCRIPTION OF THE FIGURES

FIG. 5A is a block diagram depicting the components of the Monocular Lens HUD embodiment of the instant invention;

FIG. 14A is a block diagram depicting an embodiment of the TIC-HUD with a see through reflector;

FIG. 15A is a block diagram of the Thermal Imaging Camera with Passive Optical Display (TIC-POD) with a dual prismatic reflector;

FIG. 16E is an exploded view of the TIC component attachment;

FIG. 16F is a rear view of the TIC component attachment;

FIG. 17D is a pictorial view of the components of the TIC-HUD incorporating the Beam Splitter Reflector HUD embodiment;

FIG. 17E is a front view of FIG. 17D;

FIG. 17F is a view of the beam splitter reflector of FIG. 17D;

DETAILED DESCRIPTION OF THE INVENTION

The instant invention 100 is comprised of a portable, battery operated SCBA electronics system designed for use by firefighters and other emergency personnel equipped with an externally mounted Thermal Imaging Camera (TIC) Module and a Heads-Up Display (HUD) Module mounted inside the SCBA facemask. The SCBA electronics system is used to provide breathing air to personnel operating in harsh environmental conditions. Its primary functions include; providing the operator with an indicator of the amount of breathing air in the SCBA's air tank, monitoring the movement of the operator and emitting an alert if the operator goes without motion for a specified time, logging of alert conditions and ambient environmental conditions during operation, providing visual and audio indicators during operation to allow easier tracking of the SCBA in visually obscured environments, and amplifying the operator's voice to facilitate communications while the operator is using breathing air.

The TIC-HUD system provides the firefighter with an enhanced view of the surrounding environment, literally a window through the smoke. The TIC Module interfaces with the HUD Module and uses its display to provide the firefighter with a thermal image from its camera output. In all the preferred embodiments, the TIC Module is mounted externally on the side of the SCBA facemask, facing forward. The TIC Module has an internally mounted IR Camera, which captures infrared (IR) spectrum images from its field of view in the direction it is facing. The HUD Module is mounted inside the SCBA facemask, in a position that does not interfere with the firefighter's forward field of view. The HUD Module provides a visual display of the IR Camera output from the TIC Module. The thermal image is viewed through the Display Optics, which adjusts the focal length of the image. The optimum Display Optics will adjust the image so that the firefighter is able to view the image and look forward without having to change the focus of his eyes.

Figure 1:
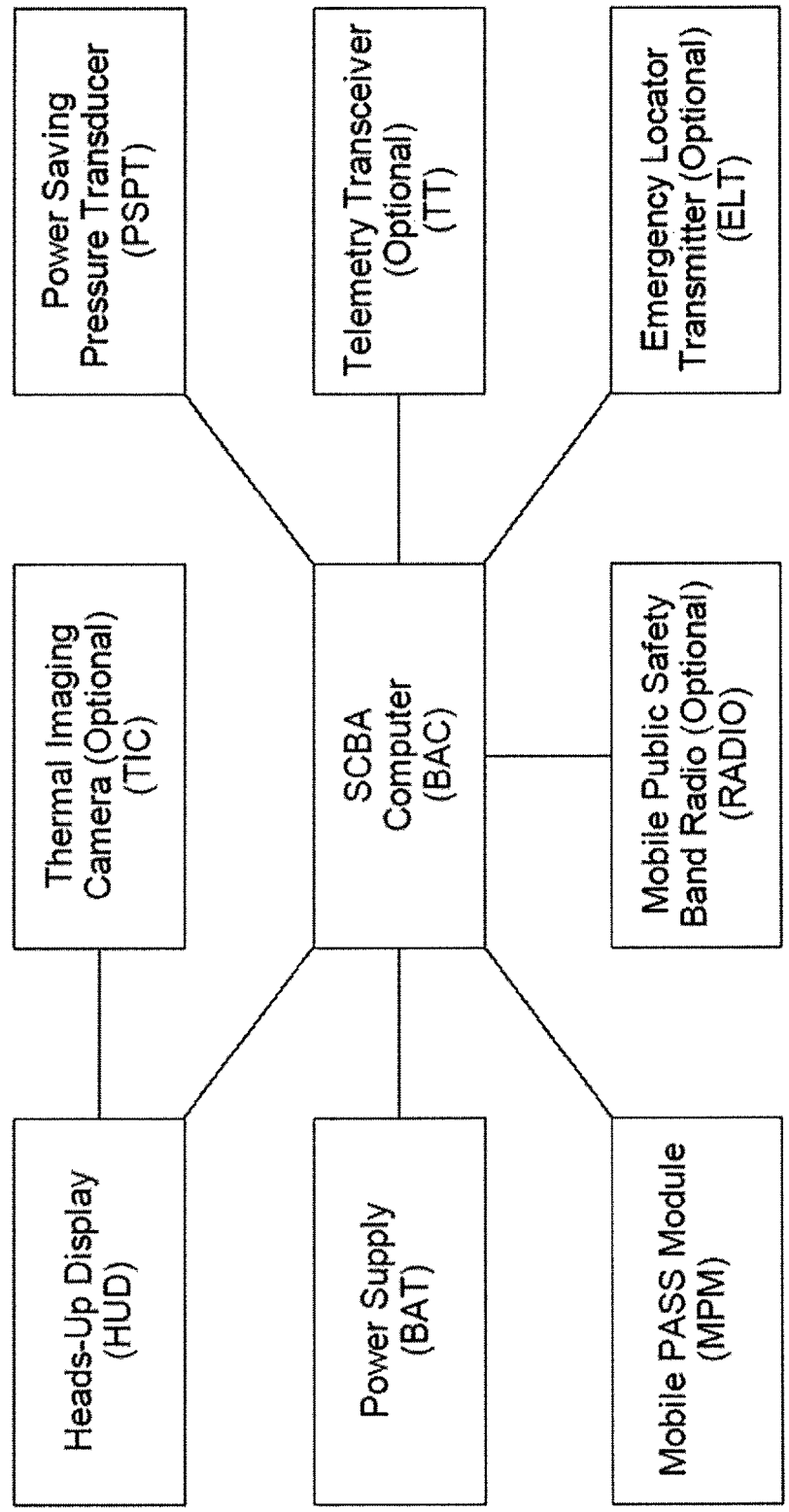
FIG. 1 is diagram of the Self Contained Breathing Apparatus (SCBA) Electronics System of the instant invention.

The SCBA system includes the following modules, as shown in FIG. 1, a Main SCBA Computer Module (BAC), Mobile Personal Alert Safety System (PASS) Module (MPM), Power Saving Pressure Transducer (PSPT) Module, Heads-Up Display (HUD) Module, Power Supply Module (BAT), Thermal Imaging Camera (TIC), Emergency Locator Transmitter (ELT) Module, Mobile Public Safety Band Radio (RADIO) Module, and Telemetry Transceiver (IT) Module, each of which is described in greater detail.

Figure 2:
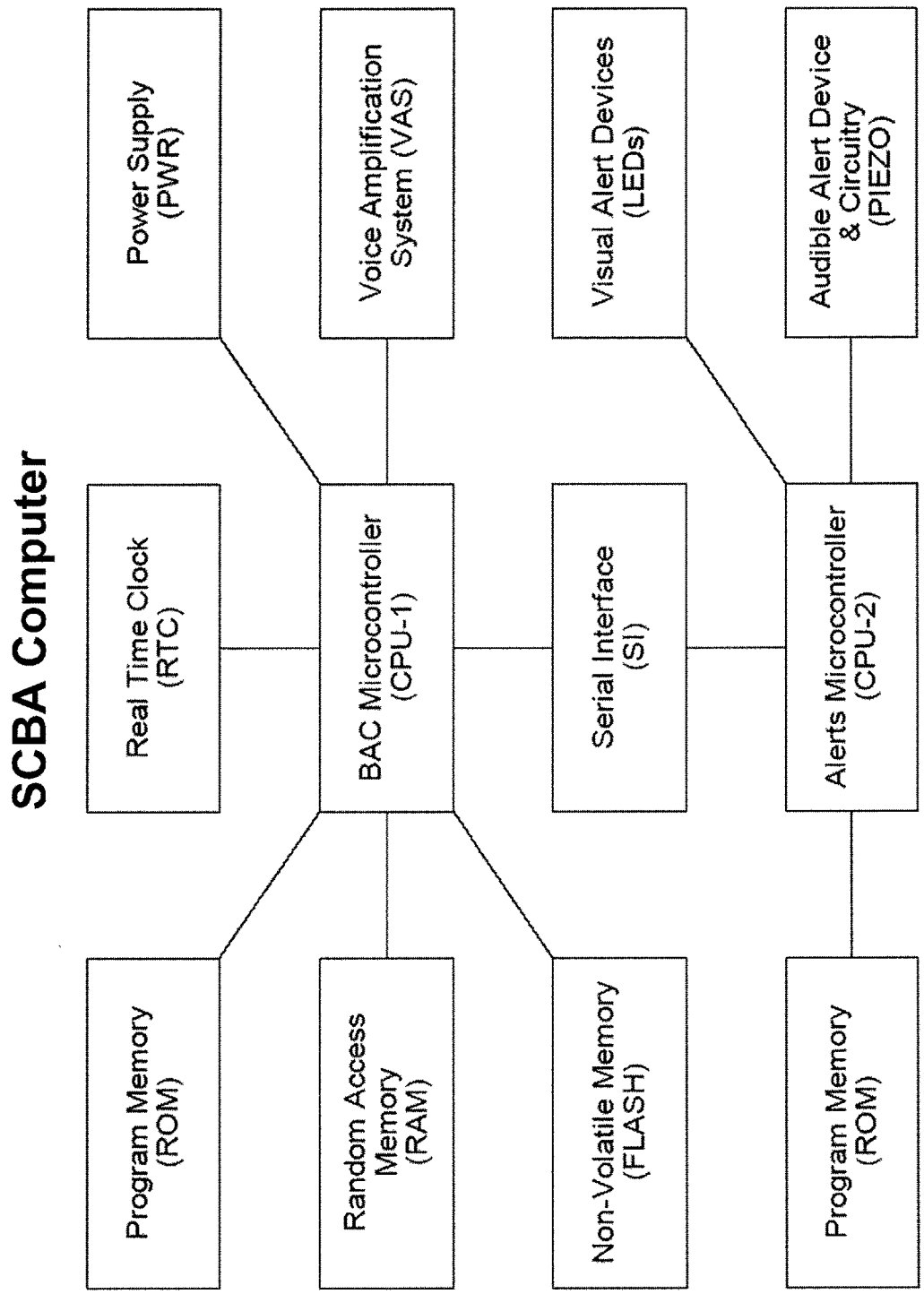
FIG. 2 is diagram of the components of the Main SCBA Computer Module of the instant invention.

The Main SCBA Computer Module (BAC) is the main control module for the SCBA system. It receives power from the Power Supply Module (BAT) and interfaces to the other modules in the system. The Power Supply Module (BAT) contains the system batteries. It connects to the BAC module through a power supply cable. It contains power protection circuitry to allow the SCBA electronics to comply with UL 913, 6th edition. The primary components for the BAC module are shown in FIG. 2. This module is responsible for the following functions: supplying power to the other modules (PWR), monitoring the system battery voltage, logging of events that occur during operation into the flash Memory, maintaining a real time clock (RTC) to provide a time stamp for logged events, reading current system pressure from the PSPT through a serial interface, sending pressure readings and alerts messages to the HUD display through a serial interface, communicating with the MPM through a serial interface, sounding audible system alerts through the Alerts Microcontroller, illuminating visual system alerts, controlling activation of the Emergency Locator Transmitter (ELT) Module, communicating with the Telemetry Transmitter (TT) module through a serial interface, routing voice audio from the HUD Display microphone to the Voice Amplification System (VAS), routing voice audio from the HUD Display microphone to the RADIO module, routing audio from the VAS to the MPM speaker and routing audio from the RADIO module to the Voice Amplifier.

Figure 3:
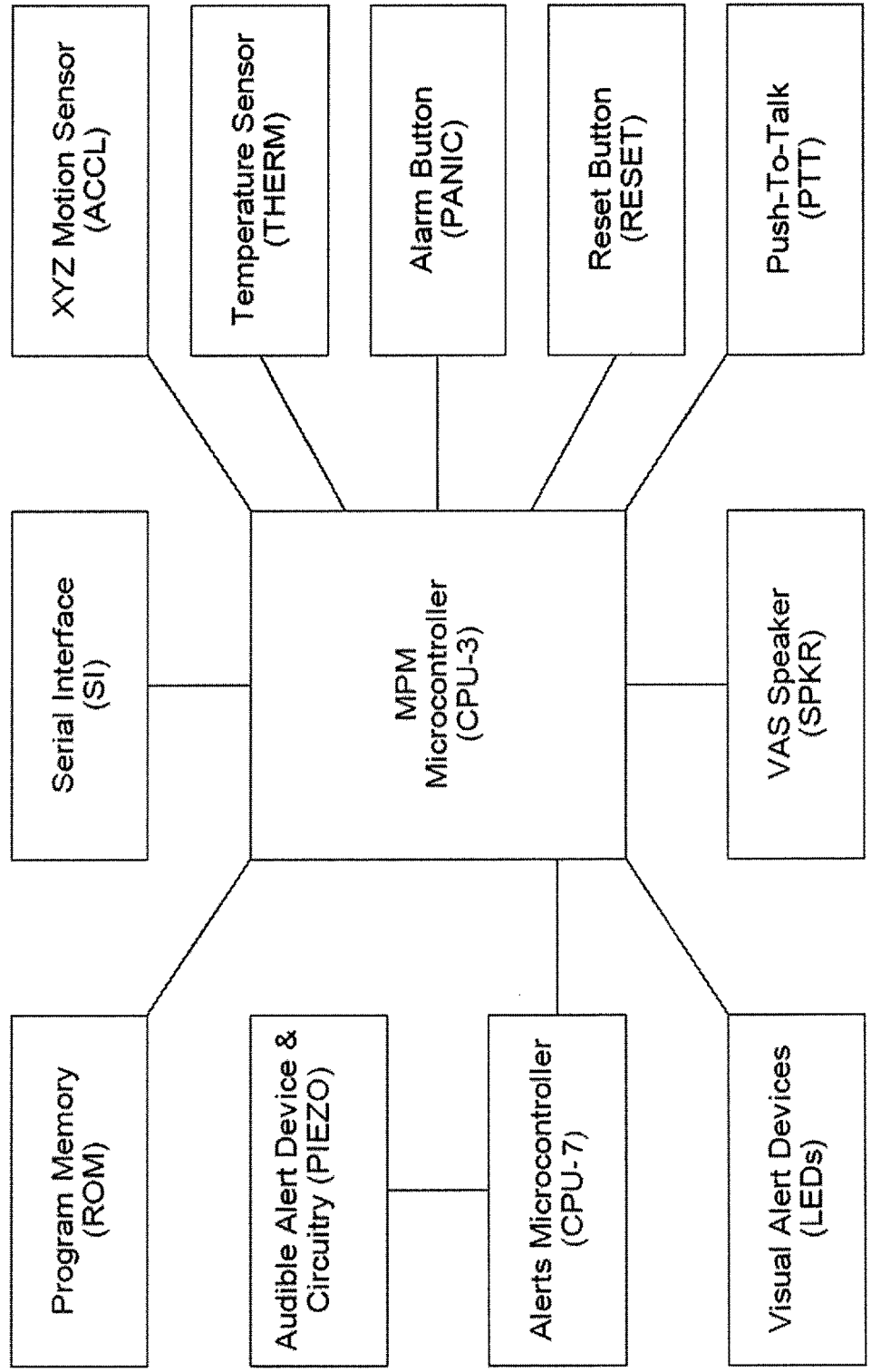
FIG. 3 is a diagram of the components of the Mobile Personal Alert Safety System (PASS) Module of the instant invention.

As shown in FIG. 3, the Mobile Personal Alert Safety System (PASS) Module (MPM) provides an interface to the operator for controlling the operations of the SCBA system, including, but not limited to, activating the system using the PANIC button, resetting the system using the RESET button and routing of the voice audio of the Voice Amplification System (VAS) using the Push to Talk (PTT) button. The MPM module also detects motion during operation, monitors ambient temperature, sounds audible system alerts through the Alerts Microcontroller, and illuminates visual system alerts. The MPM houses the speaker for the VAS and it communicates with the BAC module through a serial interface.

Figure 4:
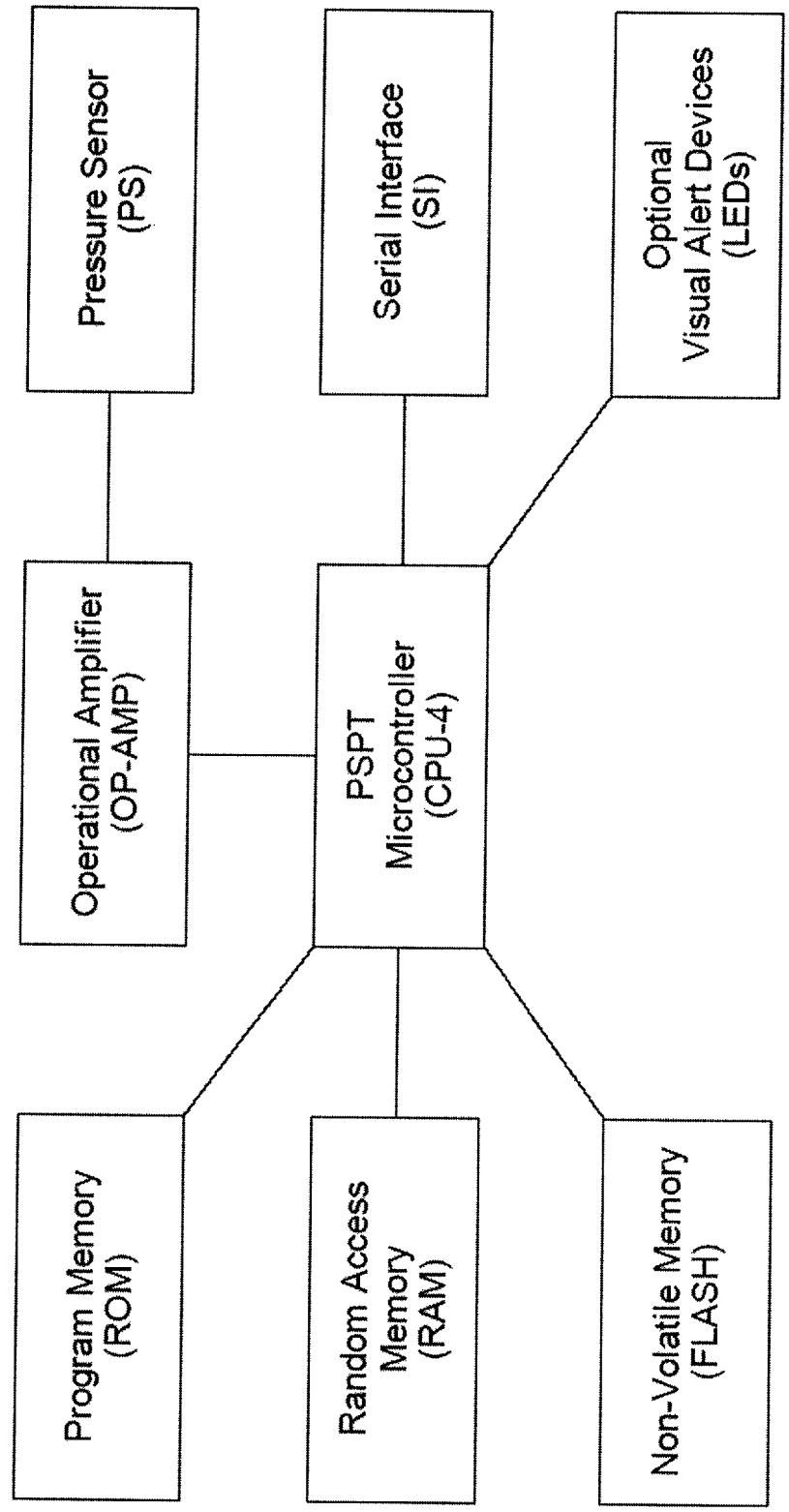
FIG. 4 is a diagram of the components of the Power Saving Pressure Transducer (PSPT) Module of the instant invention.
Figure 8:
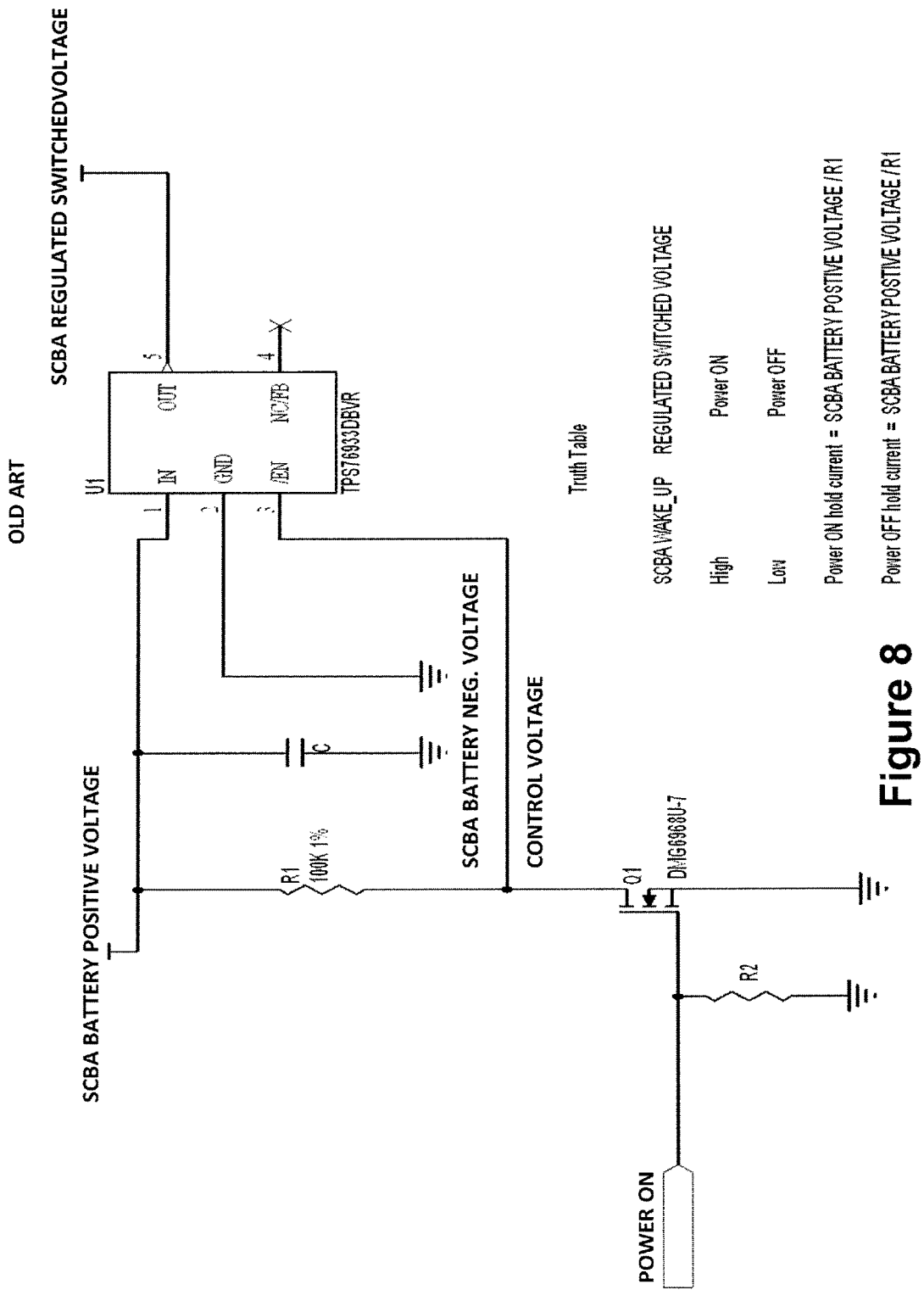
FIG. 8 is a schematic representation of an EMI resistance circuit of the prior art.
Figure 9:
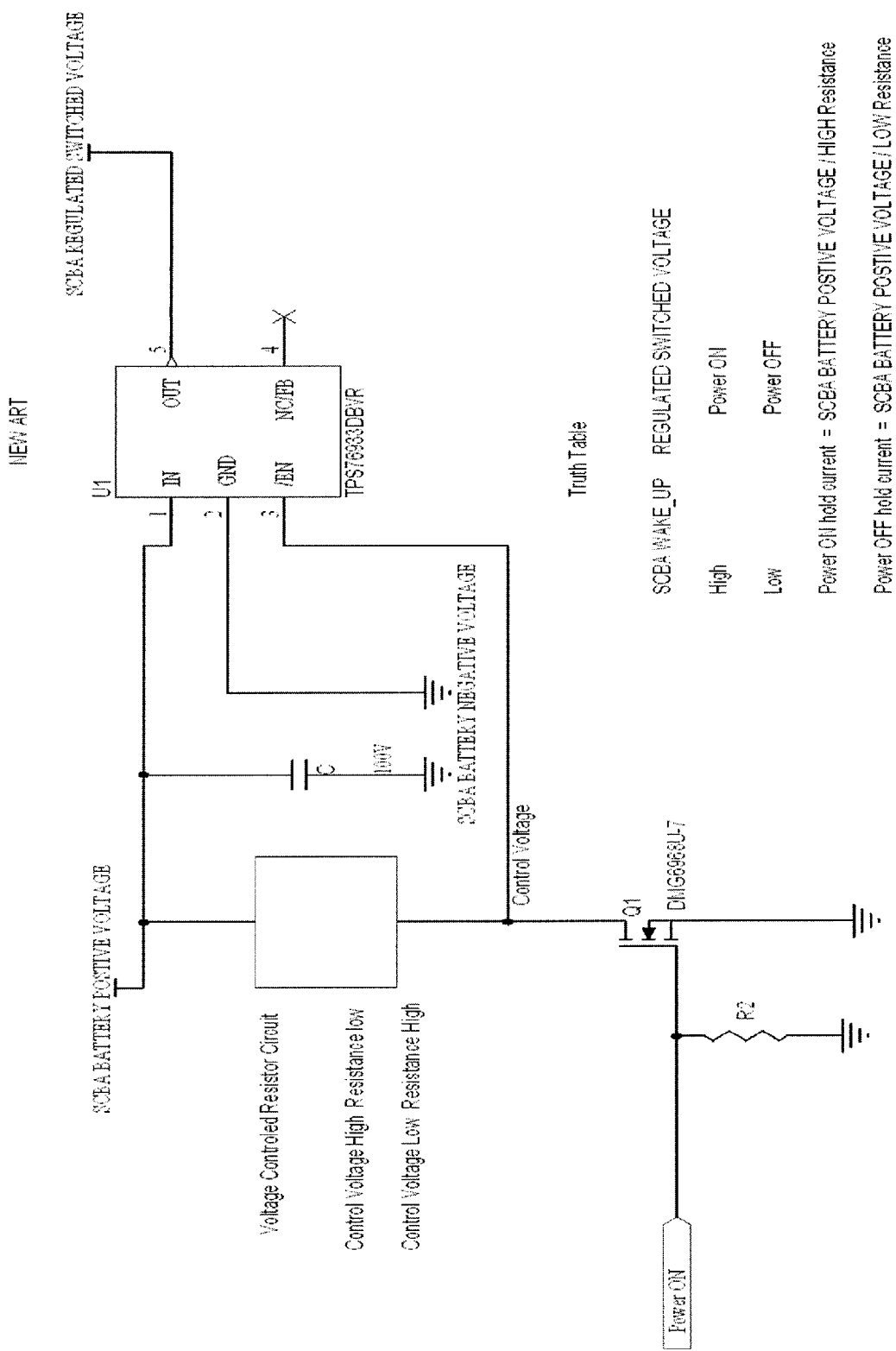
FIG. 9 is a schematic representation of an EMI resistance circuit of the instant invention.

As shown in FIG. 4, the Power Saving Pressure Transducer (PSPT) Module monitors the SCBA air pressure. It is required to continuously monitor the system pressure, even when the system is inactive, so it is always under power. It communicates with the BAC module through a serial interface. In order to maximize battery life the PSPT utilizes a low power sleep mode to conserve battery life. Specifically, a high current regulator for Active Mode operation and a low quiescent current regulator for Inactive (Sleep) Mode operation. The most common EMI resistance circuit methods employs shielding, low source impedance and protection devices to mitigate the effects of EMI, as shown in FIG. 8. The disadvantage of the low source impedance technique is that the amount of power required in protecting the circuit increases with protection levels. The lower the impedance of the circuit the greater the EMI protection level and power consumed. The instant invention provides a power conserving EMI Circuit that changes the impedance of the circuit from a low impedance high protection when the SCBA electronics is in Sleep Mode to high impedance low power when in Active Mode to save battery power, shown in FIG. 9. Thus when the SCBA is in Sleep Mode the impedance is low for EMI resistance and when the SCBA is in Active Mode the impedance is high for power saving purposes. The low quiescent current regulator is used to power only the SCBA components that are required for Sleep Mode operation, which includes the PSPT Module which monitors the air tank pressure and the RTC continuously. When the PSPT detects air tank pressure above the NFPA specified level, it forces the SCBA system to become active by switching on the high current voltage regulator. The PSPT conserves power by operating in a low power mode the majority of the time. An internal clock that runs in the PSPT during Sleep Mode periodically 'wakes up' the PSPT Module to allow it to perform an Air Tank pressure measurement.

Additionally, the PSPT Module employs a piezo-resistive pressure sensor to measure the pressure of the SCBA breathable air during operation. The pressure sensor is in direct contact with the breathable air (open circuit). Prior art SCBA manufacturers utilize a closed system with an oil filled sensor chamber sealed with a thin metal diaphragm. The disadvantage of the closed system is that under high temperature the enclosed oil can expand and create an artificially high pressure reading, and under extreme temperature conditions the metal diaphragm can rupture. The instant invention employs an open circuit measurement system in the PSPT. Therefore, temperature issues associated with the closed systems do no exist, but moisture in the breathable air could possibly come into direct contact with the pressure sensor and affect the pressure reading. The PSPT utilizes an open circuit pressure measurement design featuring a capillary tube that prevents water from entering the chamber containing the pressure sensor, allows the breathable air to come into direct contact with the pressure sensor, and gives good pressure measurement performance over a wider temperature range than a closed circuit system. The PSPT utilizes a 0.015" diameter capillary tube (the opening is sufficiently small in diameter to prevent water from entering in to the pressure sensor chamber) at the opening of the chamber containing the pressure sensor to block water from entering the chamber but allowing the breathable air to pass unobstructed.

However, the piezo-resistive pressure sensor is susceptible to EMI and RFI noise. When a voltage is applied to the pressure sensor it outputs a voltage that it proportional to the applied pressure. The output voltage from the pressure sensor is then amplified, utilizing op amps, to give a higher voltage level for more accurate measurement. The amplified signal from the op amps is very sensitive to EMI or RFI noise in the environment because any outside noise is also amplified. When the SCBA is inactive, the PSPT is constantly monitoring the breathable air pressure. When the air pressure rises above a specified level, the PSPT will awaken the SCBA electronics. In a system without any filtering of EMI or RFI noise, a large noise spike could be interpreted as pressure and cause the SCBA electronics to wake-up inadvertently. The EMI and RFI noise usually manifests as a short spike in pressure which could be filtered out using a firmware algorithm. The algorithm checks for a constantly increasing air pressure over a period of time to verify that the pressure is valid prior to waking up the SCBA electronics.

The Modules that comprise the SCBA Electronics System are required to communicate with each other reliably in harsh environments that include temperature extremes and high levels of RFI and EMI. Prior art devices commonly implemented communication schemes using single line serial communications that were more susceptible to errors due to interferences. To insure reliable communications the instant invention utilizes a derivative of the IEEE RS-485 communications bus the circuit design for communication between the various SCBA Electronics Modules. Specifically, the RS-485 bus circuit design is implemented for error detection due to interference.

As shown in FIG. 5A, the Heads-Up Display (HUD) Module provides a visual indication of the SCBA air pressure and a visual indication of SCBA electronics system alerts. It also contains a microphone to provide voice audio to the VAS in the BAC module and interface for a non NFPA mandated Thermal Imaging Camera (TIC). It communicates with the BAC module through a serial interface.

Figure 5B:
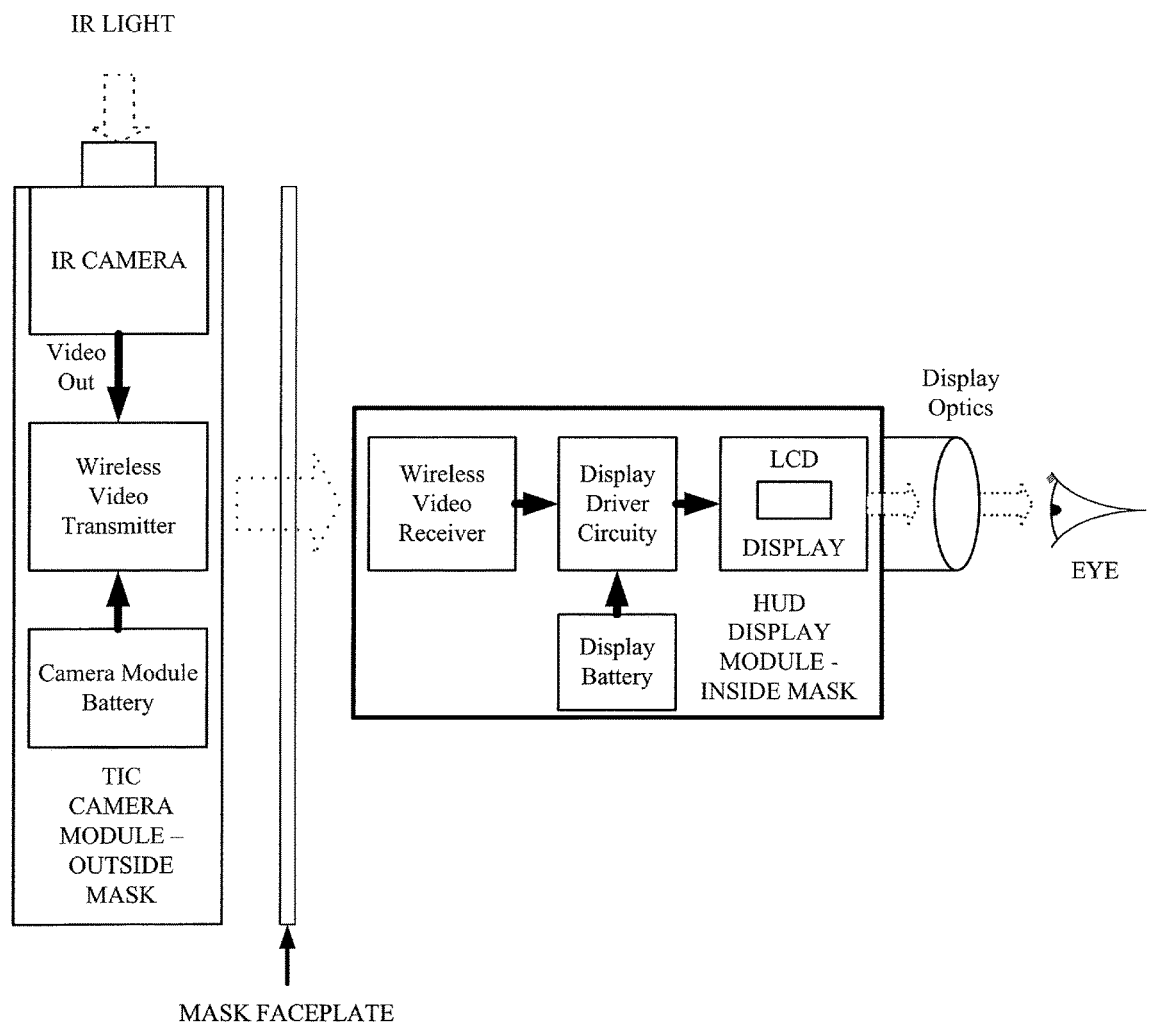
FIG. 5B is a block diagram depicting the components of the Monocular Lens HUD embodiment of the instant invention.

FIG. 5B depicts a block diagram of the 'Monocular Lens HUD' embodiment of the TIC-HUD. In this embodiment, the system consists of a Thermal Imaging Camera (TIC) Module and a Heads-Up Display (HUD) Module that communicate wirelessly.

The TIC Module has an internally mounted IR Camera, a Wireless Video Transmitter and a battery, labeled 'Camera Module Battery' in the diagram. The Wireless Video Transmitter transmits the output of the IR Camera wirelessly to the HUD Module using a radio frequency or optical signal.

The HUD Module contains a Wireless Video Receiver, an LCD Display, OLED or other type of graphic display, Display Driver Circuitry, Display Optics, and a Display Battery. The power for the HUD Module is provided by batteries as part of the HUD Module or externally from the SCBA main power, using the SCBA Interface connection, depending on the SCBA configuration. The HUD Module receives the IR Camera output through the Wireless Video Receiver. The image is processed through the Display Driver Circuitry and then displayed on the LCD Display. The LCD Display image is viewed through the Display Optics, which adjusts the focal length of the image. A brightness adjustment of the TIC camera output could be done automatically by incorporating ambient light detection circuitry into the external TIC housing or manually using external buttons on the TIC housing. If the SCBA system accommodates a connection to the TIC-HUD though the SCBA Interface connector, a Microphone and Amplifier could be used to transfer the firefighter's voice to the SCBA system.

Figure 5C:
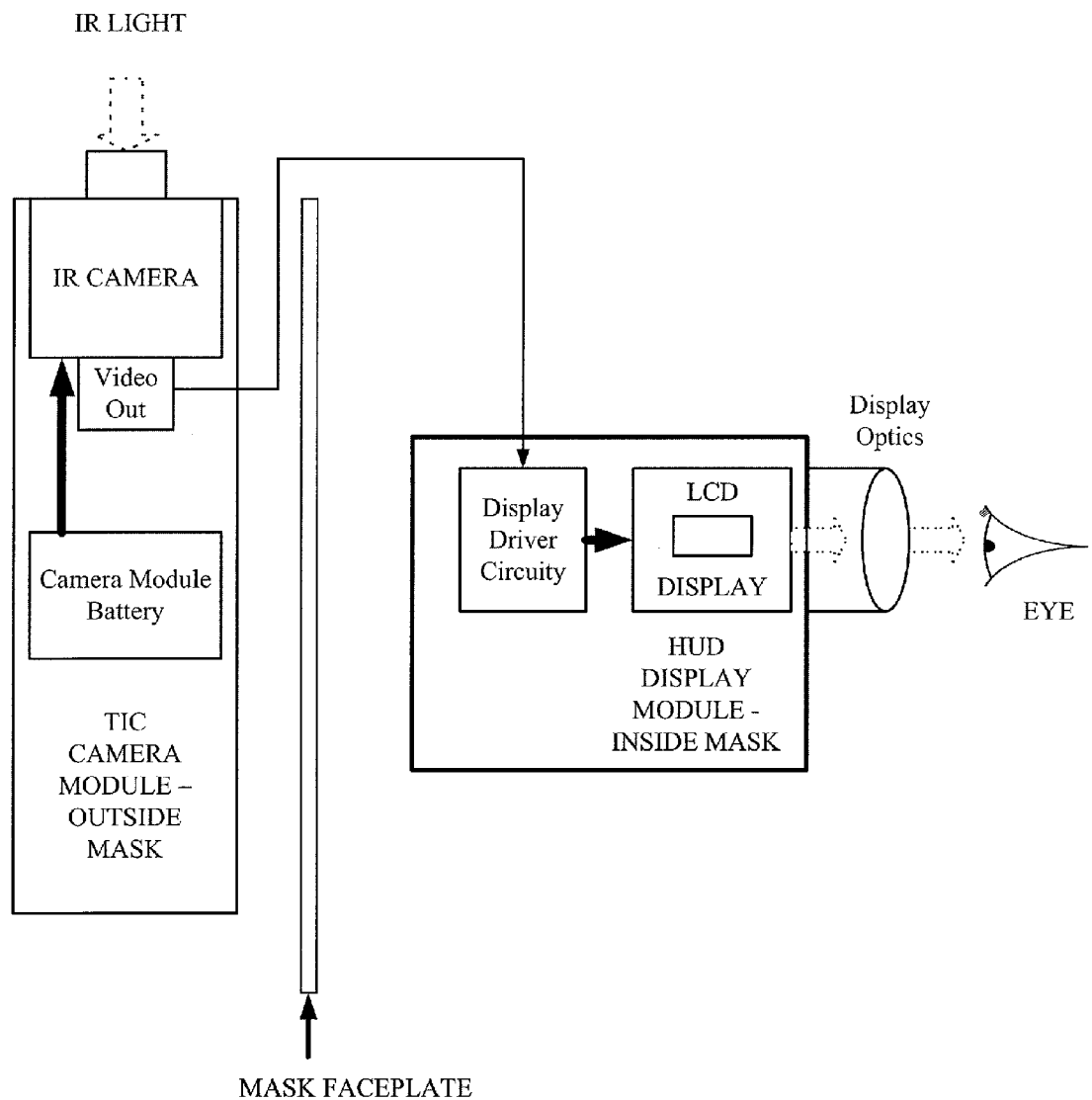
FIG. 5C is a block diagram depicting the components of the Monocular Lens HUD embodiment of the instant invention.

FIG. 5C depicts a block diagram of the 'Monocular Lens HUD' embodiment of the TIC-HUD with a wired connection. The TIC Module transmits the output of the IR Camera to the HUD Module using a high temperature ribbon cable or flex cable, which is routed around the edge of the facemask visor and connected to the HUD Module. In this embodiment, the HUD Module does not require a Wireless Video Receiver or a battery. The high temperature ribbon cable or flex cable would be thin enough to run underneath the SCBA facemask visor seal without compromising the integrity of the seal.

In this embodiment, power for the HUD Module is provided by the TIC batteries (Camera Module Battery) or the central SCBA system batteries, through the SCBA Interface connection. A brightness adjustment of the TIC camera output could be done automatically by incorporating ambient light detection circuitry into the external TIC housing or manually using external buttons on the TIC housing. If the SCBA system accommodates a connection to the TIC-HUD though the SCBA Interface connector, a Microphone and Amplifier could be used to transfer the firefighter's voice to the SCBA system.

Figure 10:
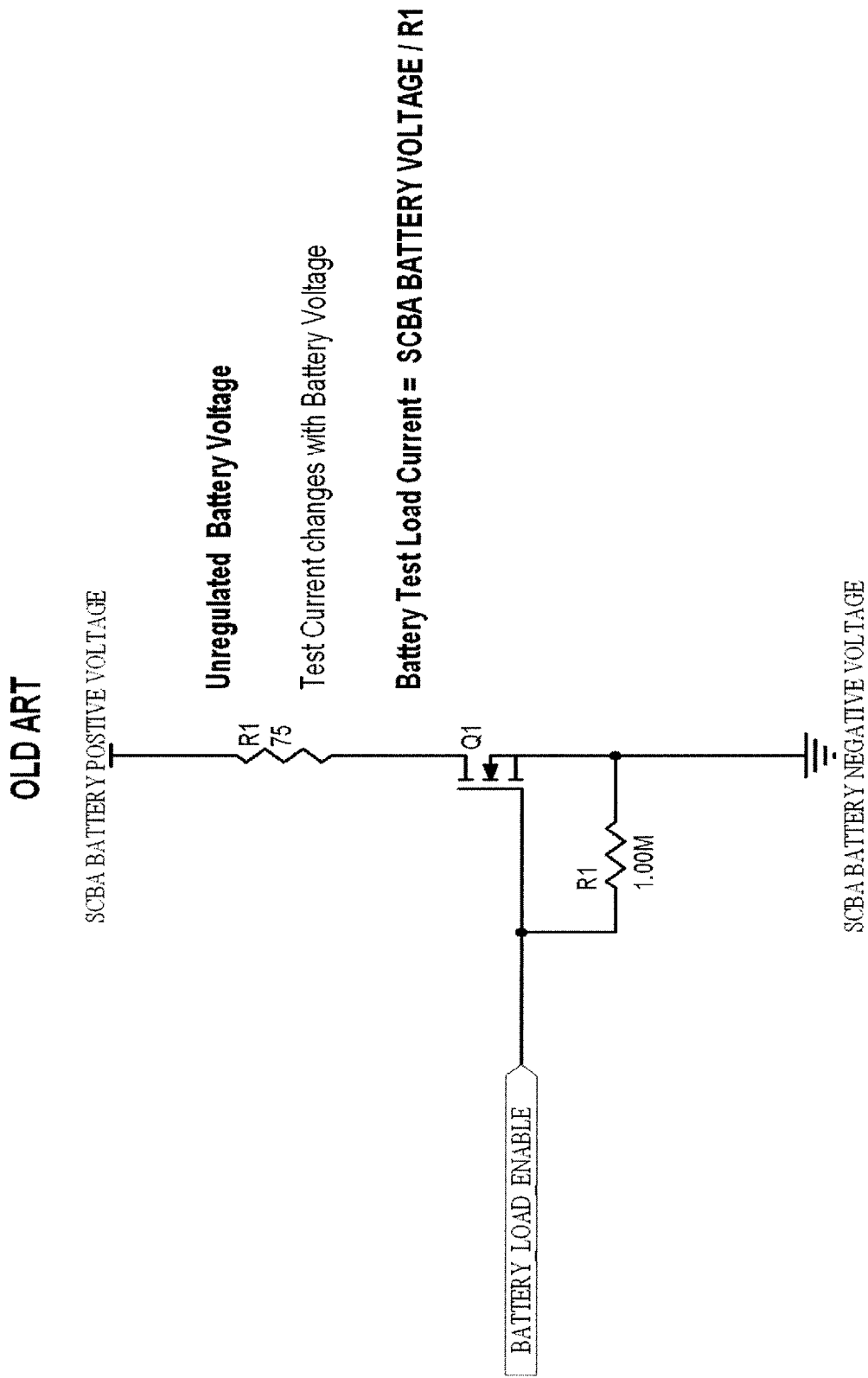
FIG. 10 is a schematic representation of the common battery load test of the prior art.
Figure 11:
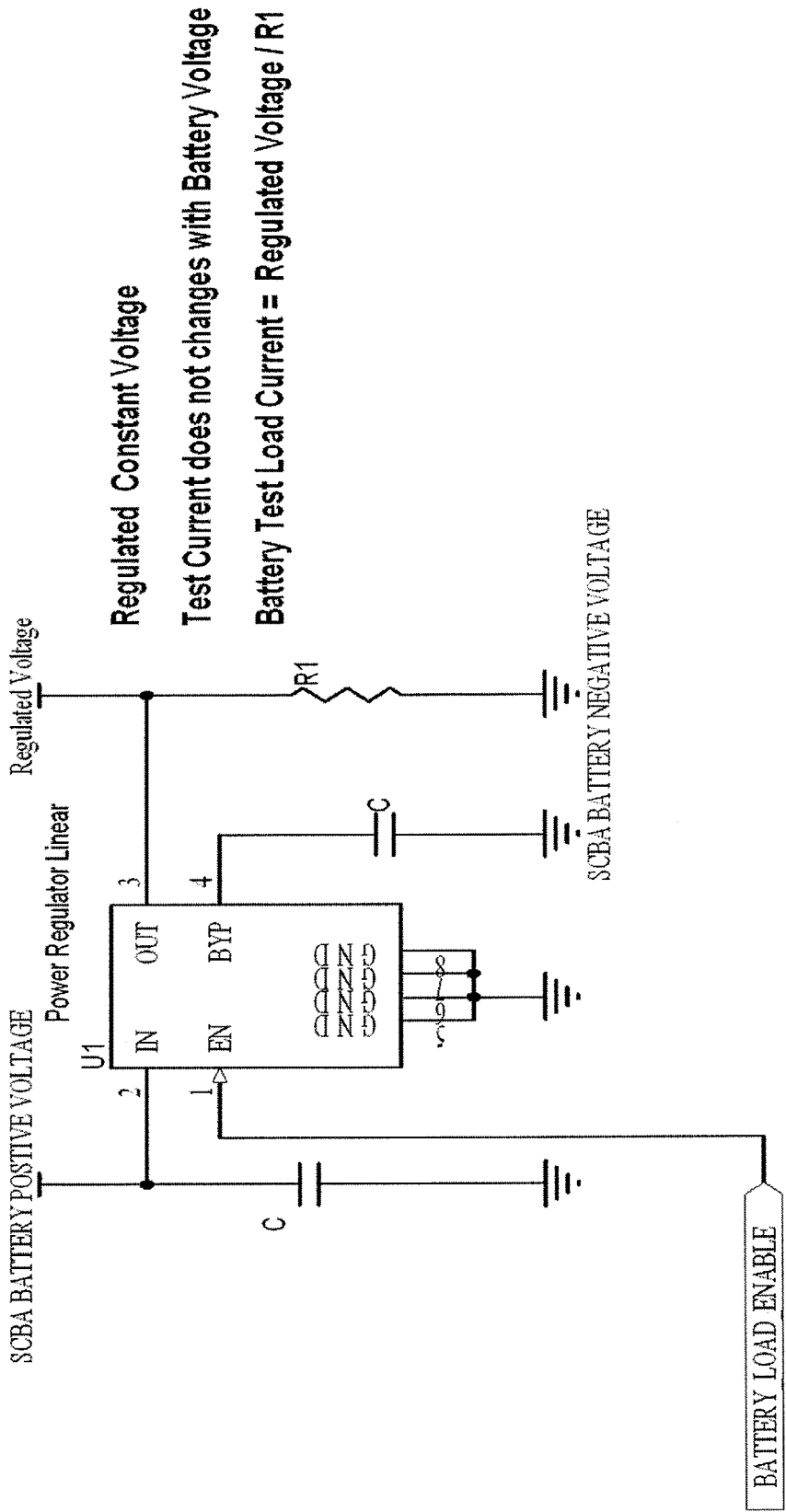
FIG. 11 is a schematic representation of the linear regulator battery load test of the instant invention.

In the instant invention a method for conserving battery power in SCBA Electronics Systems during battery load testing is provided. As shown in FIG. 10, the prior art uses a common battery test load method which employs a fixed resistor value switched across the battery as a temporary load. The voltage across the battery is monitored during the load test. As the battery capacity decreases the battery voltage also decreases. The battery test load current is a function of OHM'S law (Current=Voltage/Resistance). As the battery voltage decreases due to discharge the battery test load current also decreases. The ohm value of the battery test load resistor must be selected to guarantee that the low battery voltage load is similar to the actual SCBA load using ohm law. This causes the battery test load current at high battery voltage levels to be unnecessary excessive, decreasing battery life. The instant invention provides a system that employs a voltage regulator and a fixed battery load resistor, shown in FIG. 11. The voltage regulator provides a fixed voltage across the battery load resistor to perform a SCBA battery health check. The voltage regulator can be any circuit that provides a fixed voltage across the battery test load resistor. Thereby the system conserves battery power at high battery voltage during the SCBA health check when the battery is placed under load. Additionally, a low leakage solid state transistor is provided to switch the battery power to the voltage regulator on and off.

Figure 12:
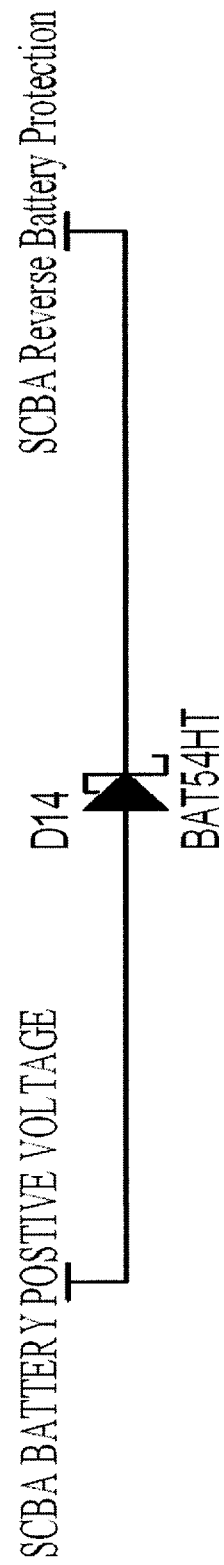
FIG. 12 is a schematic representation of reverse battery protection of the prior art.
Figure 13:
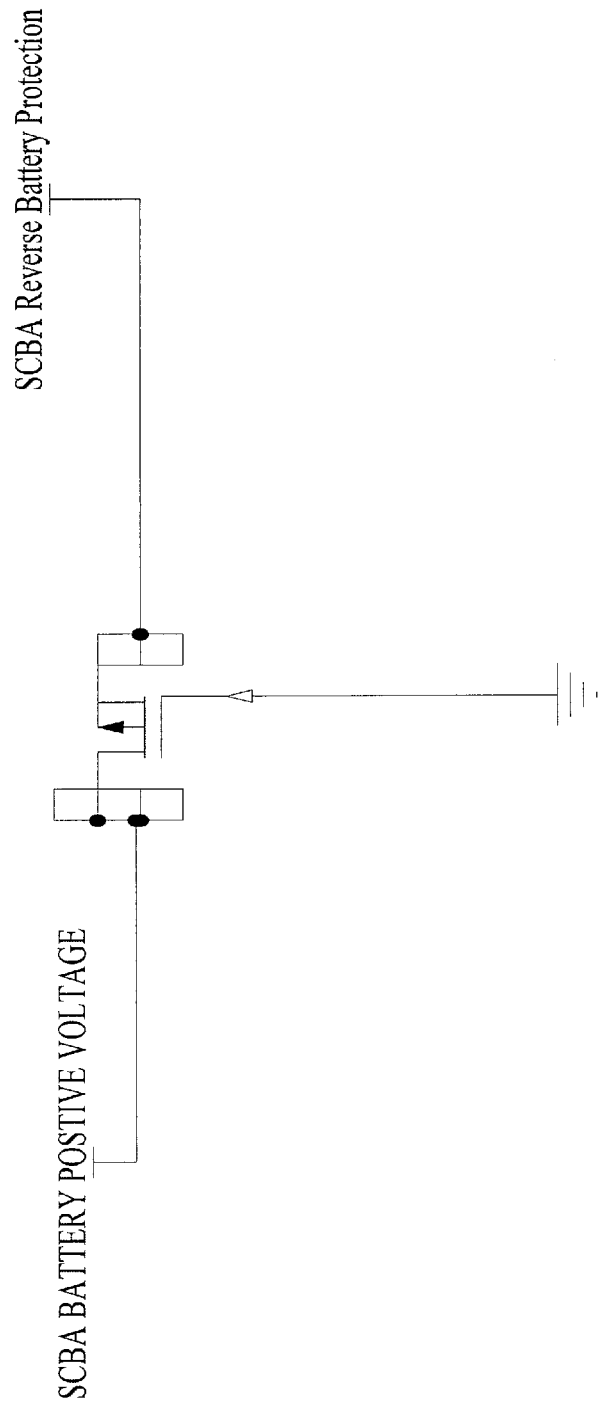
FIG. 13 is a schematic representation of reverse battery protection of the instant invention.

Furthermore, when the batteries are changed in a SCBA system may be mistakenly put in backwards. The common method of blocking reverse batteries is with a Schottky Diodes forward bias placed in series with the battery power path. The Schottky Diode Reverse battery protection has an inherent forward voltage drop which causes power loss. As shown in FIG. 12, by connecting a p-channel MOSFET in the positive supply line of the load, reverse battery protection is achieved. By referring the Gate signal to the ground line, the SCBA system is fully turned on when the battery is applied in the right polarity. For the first start up, the intrinsic body diode of the MOSFET will conduct, until the channel is switched on in parallel. By reverse polarity, the MOSFET will be switched off, because the Gate Source voltage for this case will be positive, as shown in FIG. 13.

Figure 7A:
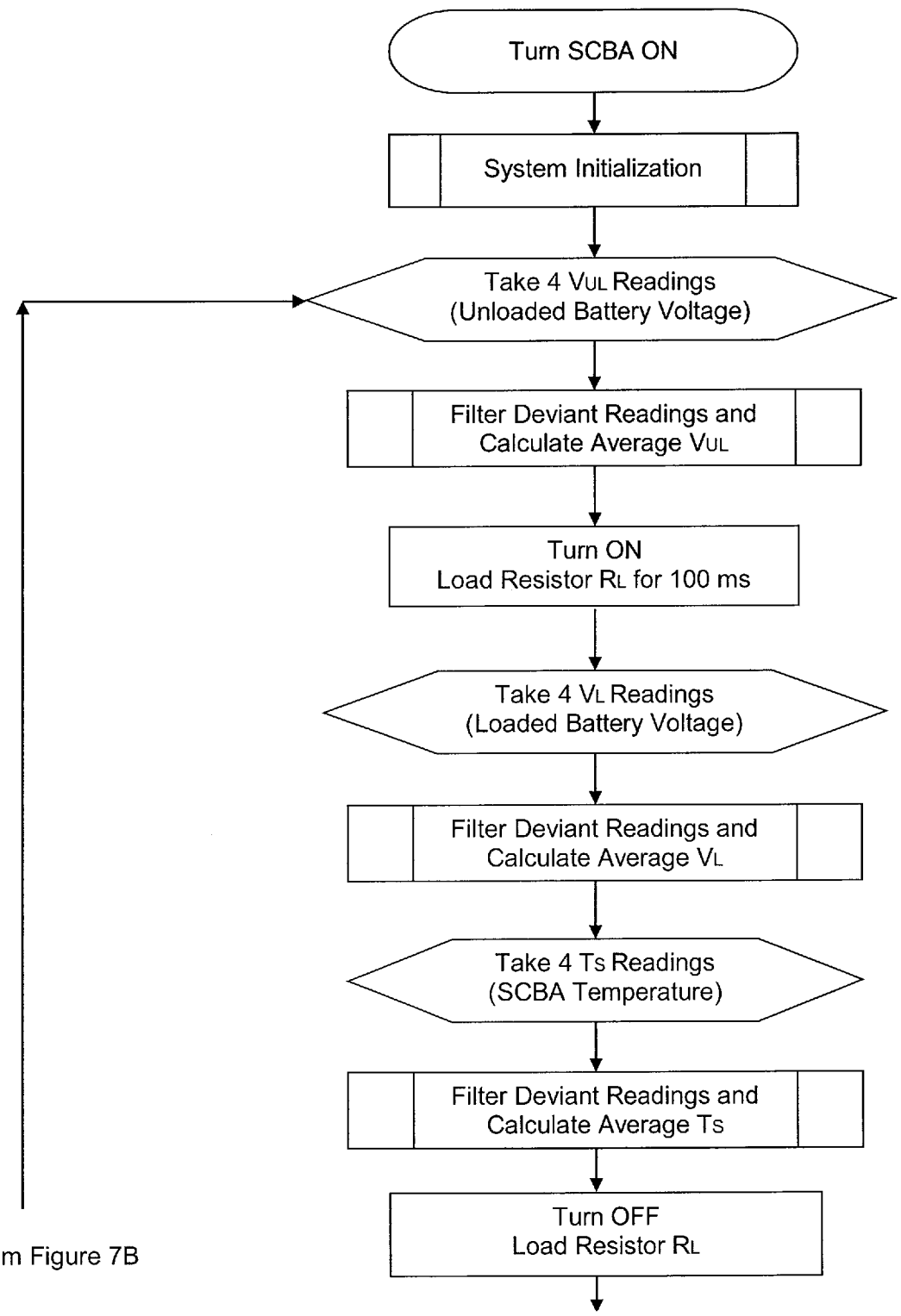
FIG. 7A is a flowchart of the method for determining battery condition and estimating remaining battery life of the instant invention.
Figure 7B:
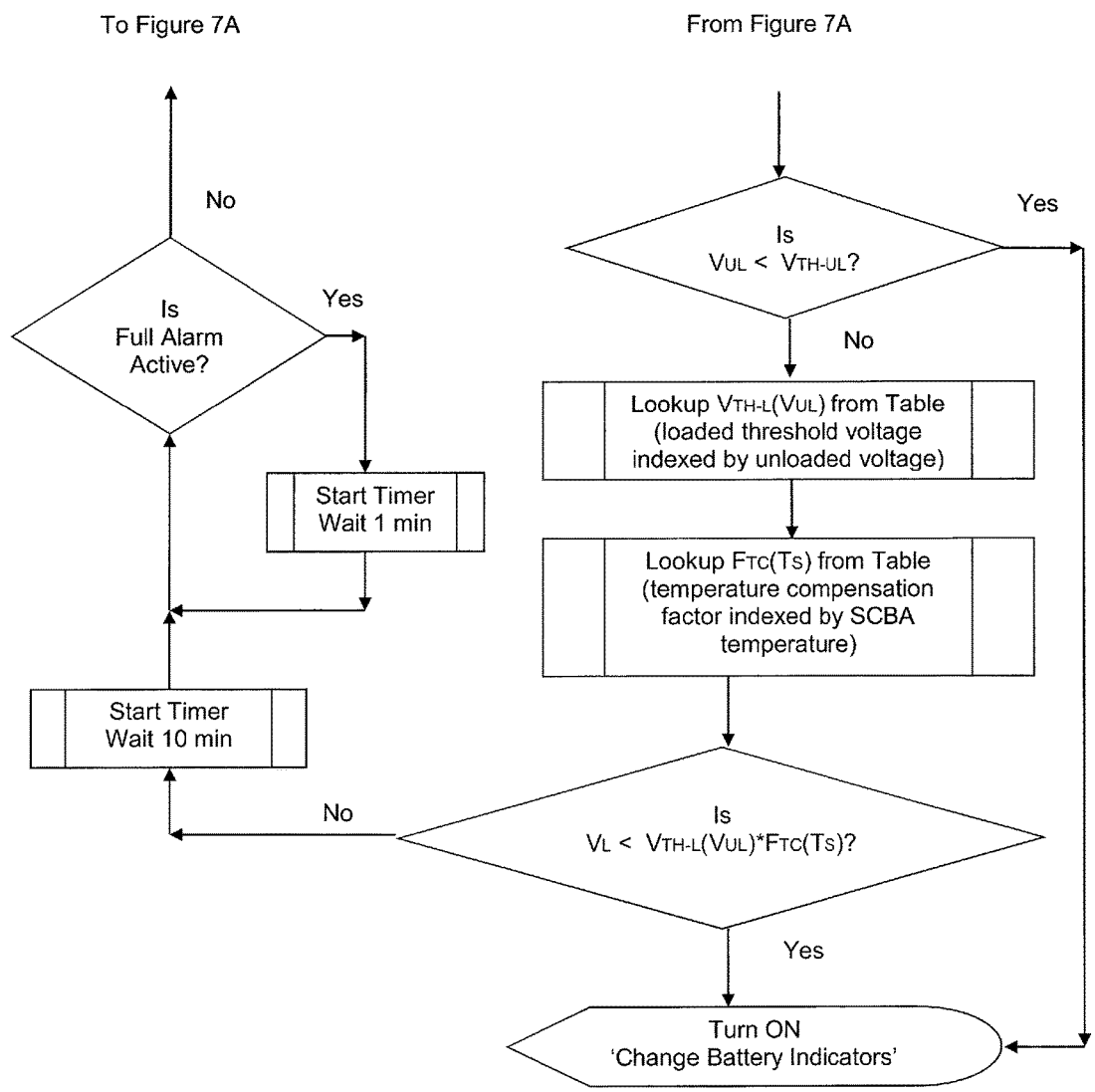
FIG. 7B is continuation flowchart of FIG. 7A.

As shown in FIGS. 7A-7B, a method for determining battery condition and estimating remaining battery life is provided. The method includes measuring a voltage on the batteries, whereby the voltage is measured in an unloaded state (VUL) and a loaded state (VL) using a temporary load that is proportional to the estimated maximum load of said electronics system. An unloaded voltage threshold level (VTH-UL) and a loaded voltage threshold level (VTH-L) can thereafter be determined empirically through measurement of the voltage decrease in SCBA's batteries during operation over time. Additionally one can then compare the unloaded (VUL) state measurement with the unloaded voltage threshold level (VTH-UL) and the loaded state voltage (VL) measurement to the loaded voltage threshold level (VTH-L). If the unloaded (VUL) state measurement is less than said unloaded voltage threshold level (VTH-UL) a change battery indicator will be activated. Additionally, the method will further include monitoring the ambient temperature so that a temperature compensation value can be applied to the threshold levels to compensate for the variation in the electronics system's load with a temperature change. Thereafter if the loaded state voltage (VL) measurement is less than the unloaded voltage threshold level (VTH-UL) having the temperature compensation value then activate the change battery indicator. The system will continuously monitor the voltage across the SCBA's batteries when the loaded (VUL) state measurement is not less than the unloaded voltage threshold level (VTH-UL) or when the loaded state voltage (VL) measurement is not less than the unloaded voltage threshold level (VTH-UL) having the temperature compensation value.

The NFPA requires that a Personal Alert Safety System (PASS) device enters Pre-Alarm Mode if a firefighter is detected to be motionless for 20 seconds. The PASS piezo emitter must generate an NFPA specified sound in Pre-Alarm Mode. If the firefighter continues to remain motionless for an additional 12 seconds, the PASS must enter Alarm Mode and generate an NFPA specified alarm sound continuously thereafter, unless the PASS piezo is turned OFF by depressing the Reset button. Most SCBA manufacturers equip their PASS devices with an accelerometer to detect motion. Some SCBA manufacturers also include a piezo emitter and/or a VAS speaker in their PASS device housing. In prior art devices, a problem/safety issue can occur when, under certain circumstances, vibrations generated by the piezo or speaker are transmitted through the PASS device housing and cause interference with the operation of the accelerometer. Specifically, this can happen when the piezo commences emitting sound, which causes vibrations, which are then transmitted through the housing to be detected by the accelerometer, which then sends a signal to the Microcontroller that it is detecting vibrations. The Microcontroller interprets the vibrations as movement by the firefighter, turns OFF the piezo and resets the 20-second clock. This can result in a safety issue because the PASS will never enter Alarm Mode even if the firefighter is unconscious or otherwise incapacitated and not moving.

The instant invention provides an accelerometer that needs only to detect low frequency motion for proper operation, as the vibration caused by the piezo emitter and/or VAS speaker has been determined to be primarily at higher frequency. Therein, a software algorithm is implemented in the Mobile PASS Module to attenuate high frequency vibrations, allowing low frequency motion to be detected with less interference. Additionally, the algorithm is further tuned separately for each axis of movement on the XYZ accelerometer.

The NFPA requires 'Black Box' data-logging for SCBA's. Thus the SCBA electronics must record and time-stamp alarm conditions and certain specified events. The data logs provide forensic information in the event of an accident during the operation of the SCBA. The RTC is used to provide the time-stamp and it is imperative that the time-stamp is accurate for forensic purposes. However, should there be an RTC failure, the time-stamp would be lost, thereby rendering the logged data useless for forensic purposes. When an RTC failure occurs, it results in the time-stamp date reverting to the RTC default date, which is typically set when the SCBA is powered for the first time. In the instant invention, upon first power up a backup time stamp is initialized and maintained by the system clock—the Microcontroller's internal oscillator (which is separate from the RTC clock); additionally a default date/time is selected for the RTC clock. Upon each subsequent power up the Microcontroller polls the RTC for the current date/time and compares the date/time provided by the RTC to the most recent time-stamp from the most recently stored data log. If the Microcontroller determines that the RTC has provided an unrealistic or invalid date/time, indicative of RTC failure, then the backup time-stamp is used henceforth in its place.

Figure 14B:
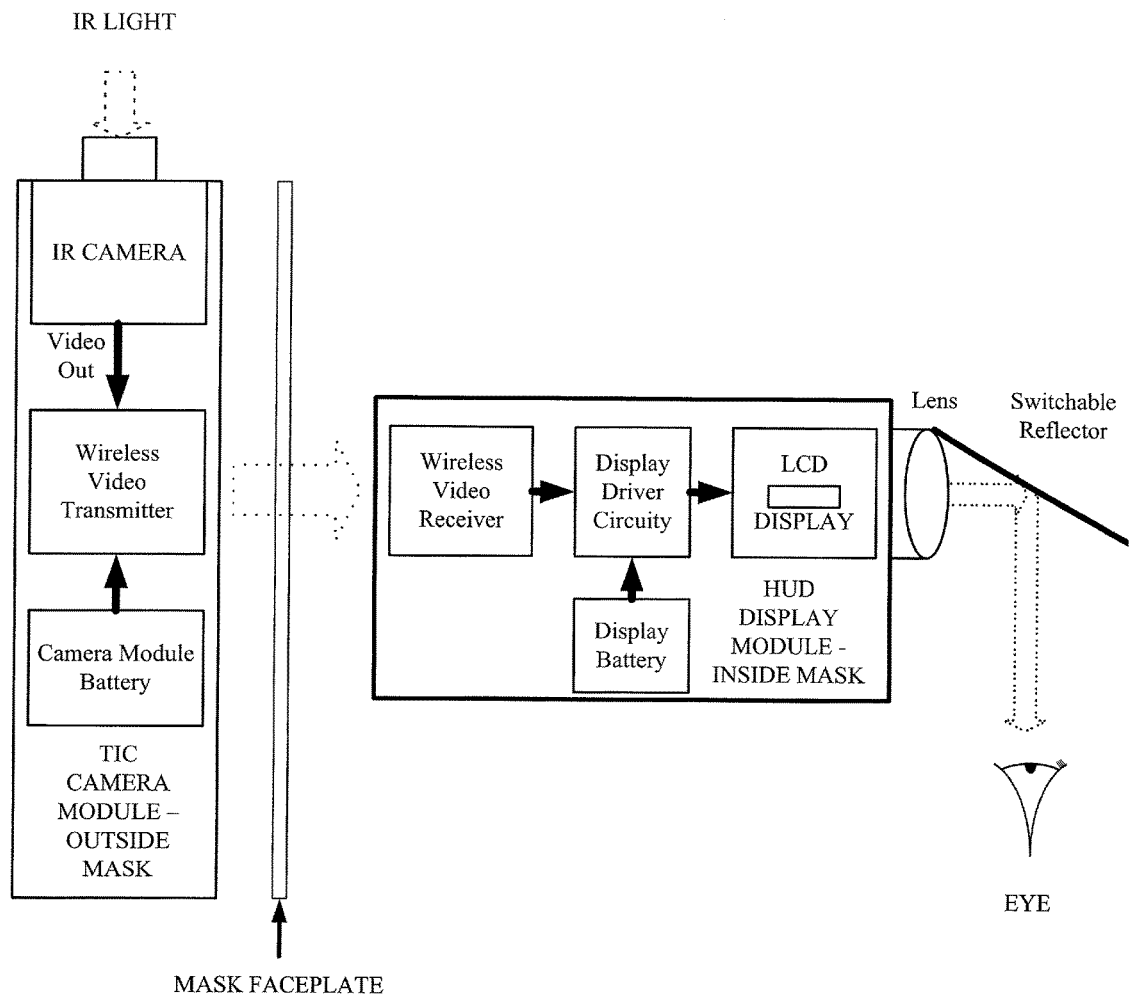
FIG. 14B is a block diagram depicting an embodiment of the TIC-HUD with a switchable reflector.

FIG. 14A depicts a wireless version of the TIC-HUD with a switchable (shutter) reflector; this block diagram has been expanded in FIG. 14B.

FIG. 14A depicts an updated block diagram of the wireless embodiment of the TIC-HUD with a switchable (shutter) reflector. The TIC Module has an internally mounted IR Camera, a Wireless Video Transmitter and a battery, labeled 'Camera Module Battery' in the diagram. The Wireless Video Transmitter transmits the output of the IR Camera wirelessly to the HUD Module using a radio frequency or optical signal.

The HUD Module contains a Wireless Video Receiver, an LCD, OLED or other type of graphic display, Display Driver Circuitry, Display Optics, a Display Battery and a Switchable Reflector. The power for the HUD is provided by batteries as part of the HUD Module or externally from the SCBA main power, using the SCBA Interface connection, depending on the SCBA configuration. The HUD Module receives the IR Camera output through the Wireless Video Receiver. The image is processed through the Display Driver Circuitry and then displayed on the LCD Display. The HUD module is mounted inside the facemask, in a position that does not obscure the operator's forward vision, such as over the bridge of the operator's nose. A transparent reflector, such as an electrically Switchable Reflector (LCD or other type) would be positioned over the operator's eye to reflect the image from the LCD Display. The HUD optics would include a Lens or Lens Assembly with the field of view (FOV) and the magnification factor adjusted to allow for a display of the visible scene that would cause the least amount of eye fatigue. For example, a scale of 1:1 would not require the firefighter to refocus his eyes when looking at the display. Referring to the electrically Switchable Reflector, when the Switchable Reflector is set to the reflector state, the operator would be able to view the reflected image from the HUD LCD Display. When the HUD is not in use, the switchable reflector would be set to the transparent state and the operator would view the visible scene directly through the reflector. A brightness adjustment of the TIC camera output could be done automatically by incorporating ambient light detection circuitry into the external TIC housing or manually using external buttons on the TIC housing. If the SCBA system accommodates a connection to the TIC-HUD though the SCBA Interface connector, a Microphone and Amplifier could be used to transfer the firefighter's voice to the SCBA system.

FIG. 14B depicts a block diagram of the wired embodiment of the TIC-HUD with a switchable (shutter) reflector. The TIC Module has an internally mounted IR Camera and a battery, labeled 'Camera Module Battery' in the diagram. The TIC Module transmits the output of the IR Camera to the HUD Module using a high temperature ribbon cable or flex cable, which is wrapped around the edge of the facemask visor and connected to the HUD Module. In this embodiment, the HUD Module does not require a Wireless Video Receiver or a battery. The high temperature ribbon cable or flex cable would be thin enough to run underneath the SCBA facemask visor seal without compromising the integrity of the seal. A brightness adjustment of the TIC camera output could be done automatically by incorporating ambient light detection circuitry into the external TIC housing or manually using external buttons on the TIC housing. If the SCBA system accommodates a connection to the TIC-HUD though the SCBA Interface connector, a Microphone and Amplifier could be used to transfer the firefighter's voice to the SCBA system.

Figure 14C:
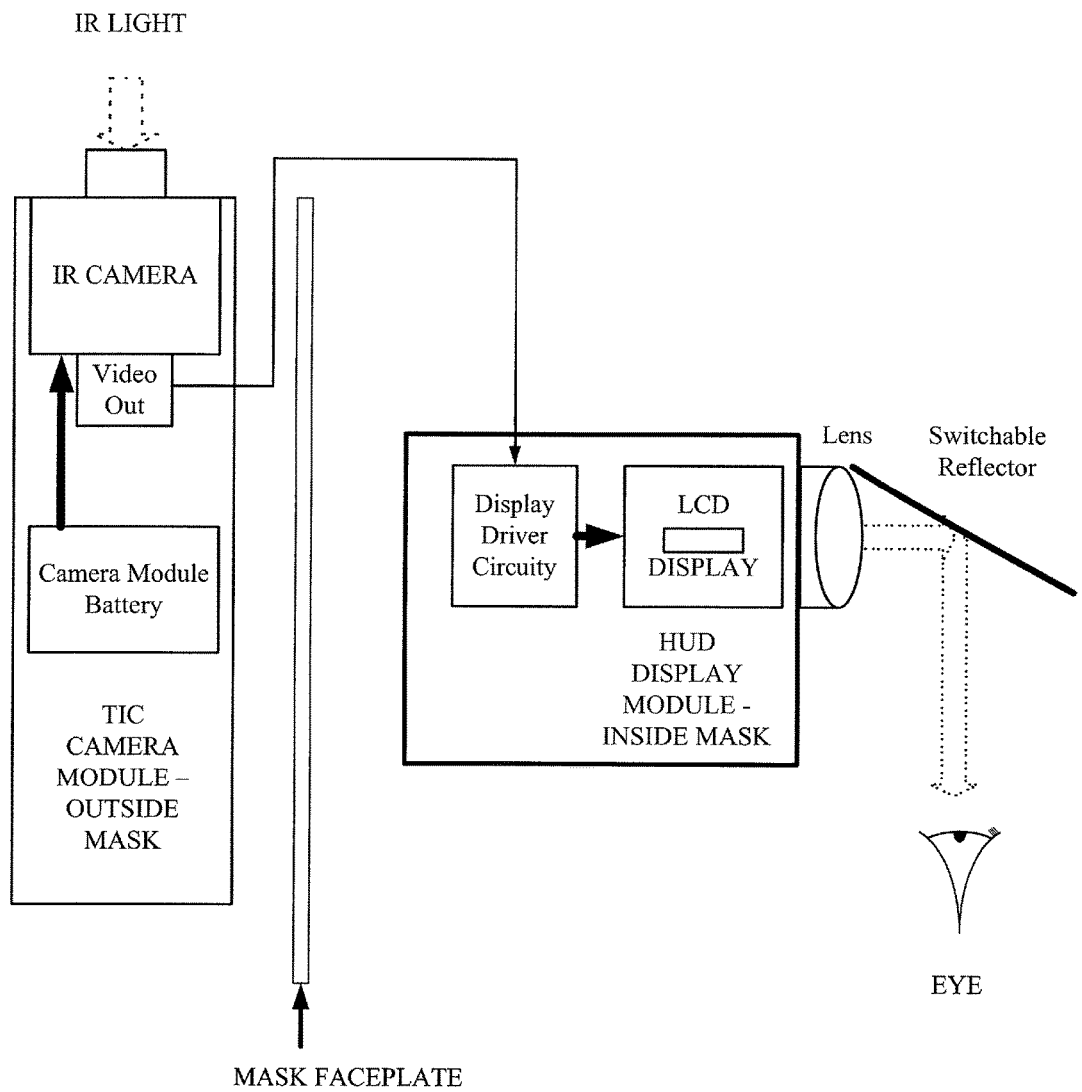
FIG. 14C is a block diagram depicting an embodiment of the TIC-HUD with a switchable reflector.

FIG. 14C depicts a block diagram of the wireless embodiment of the TIC-HUD with a beam splitter reflector. A beam splitter reflector allows a percentage of the light hitting its surface to be reflected and a percentage of the light hitting its surface to be transmitted. The ratio of reflection versus transmission can be specified for the reflector. The TIC Module is mounted externally on the side of the SCBA facemask, facing forward. The TIC Module has an internally mounted IR Camera, a Wireless Video Transmitter and a battery, labeled 'Camera Module Battery' in the diagram. The Wireless Video Transmitter transmits the output of the IR Camera wirelessly to the HUD Module using a radio frequency or optical signal.

The HUD Module contains a Wireless Video Receiver, an LCD, OLED or other type of graphic display, Display Driver Circuitry, Display Optics, a Display Battery and a Beam Splitter Reflector. The power for the HUD is provided by batteries as part of the HUD Module or externally from the SCBA main power, using the SCBA Interface connection, depending on the SCBA configuration. The HUD Module receives the IR Camera output through the Wireless Video Receiver. The image is processed through the Display Driver Circuitry and then displayed on the LCD Display. The HUD Module is mounted inside the facemask, in a position that does not obscure the operator's forward vision, such as over the bridge of the operator's nose. A Beam Splitter Reflector would be attached to the HUD and positioned over the operator's eye to reflect the image from the LCD Display. The HUD optics would include a Lens or Lens Assembly with the field of view (FOV) and the magnification factor adjusted to allow for a display of the visible scene that would cause the least amount of eye fatigue. Referring to the Beam Splitter Reflector, it would be positioned over the operator's eye so that the operator would be able the reflected image of the HUD LCD Display when the display is on and view the visible scene through this reflector when the HUD LCD Display is off. A brightness adjustment of the TIC camera output could be done automatically by incorporating ambient light detection circuitry into the external TIC housing or manually using external buttons on the TIC housing. If the SCBA system accommodates a connection to the TIC-HUD though the SCBA Interface connector, a Microphone and Amplifier could be used to transfer the firefighter's voice to the SCBA system.

Figure 14D:
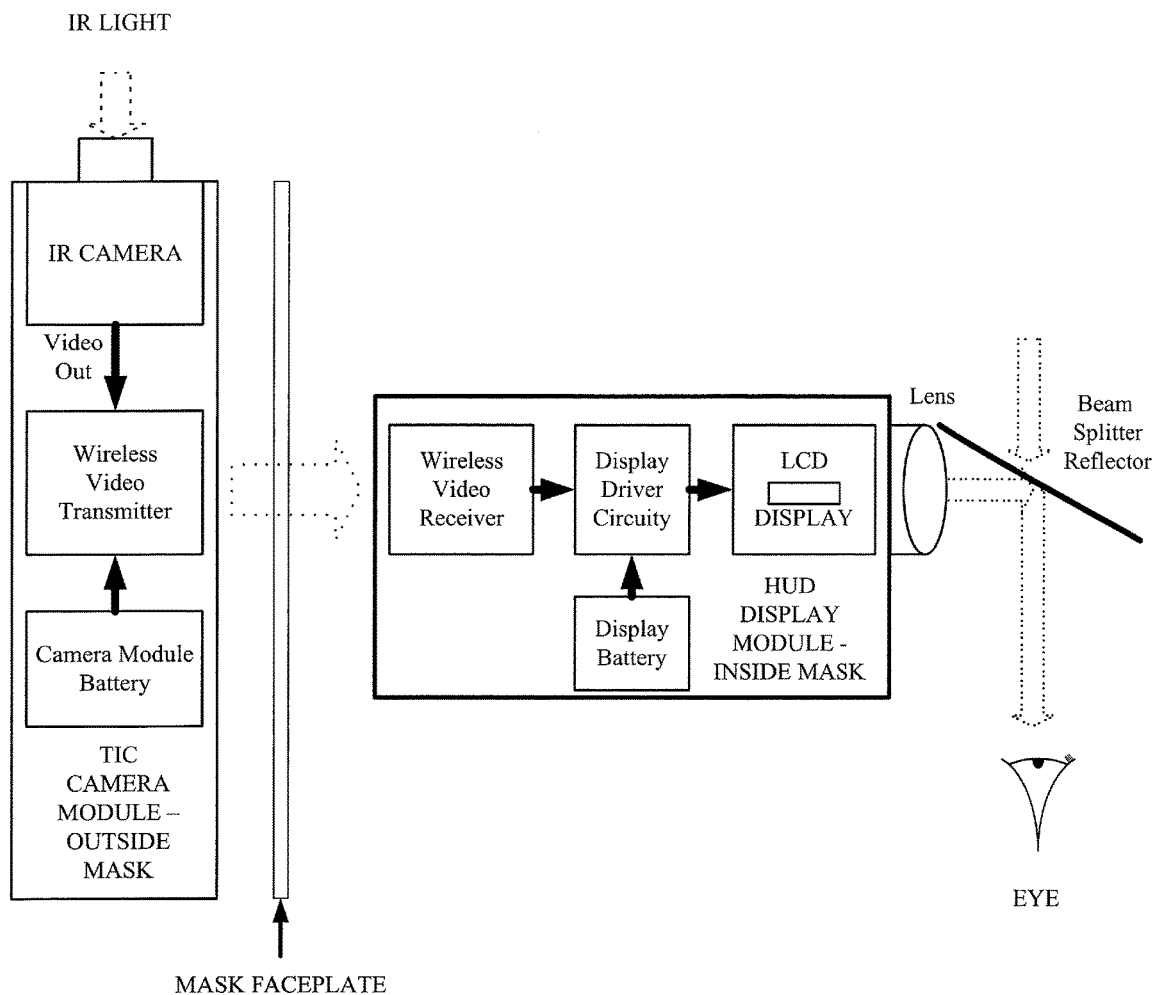
FIG. 14D is a block diagram depicting an embodiment of the TIC-HUD with a beam splitter reflector.
Figure 14E:
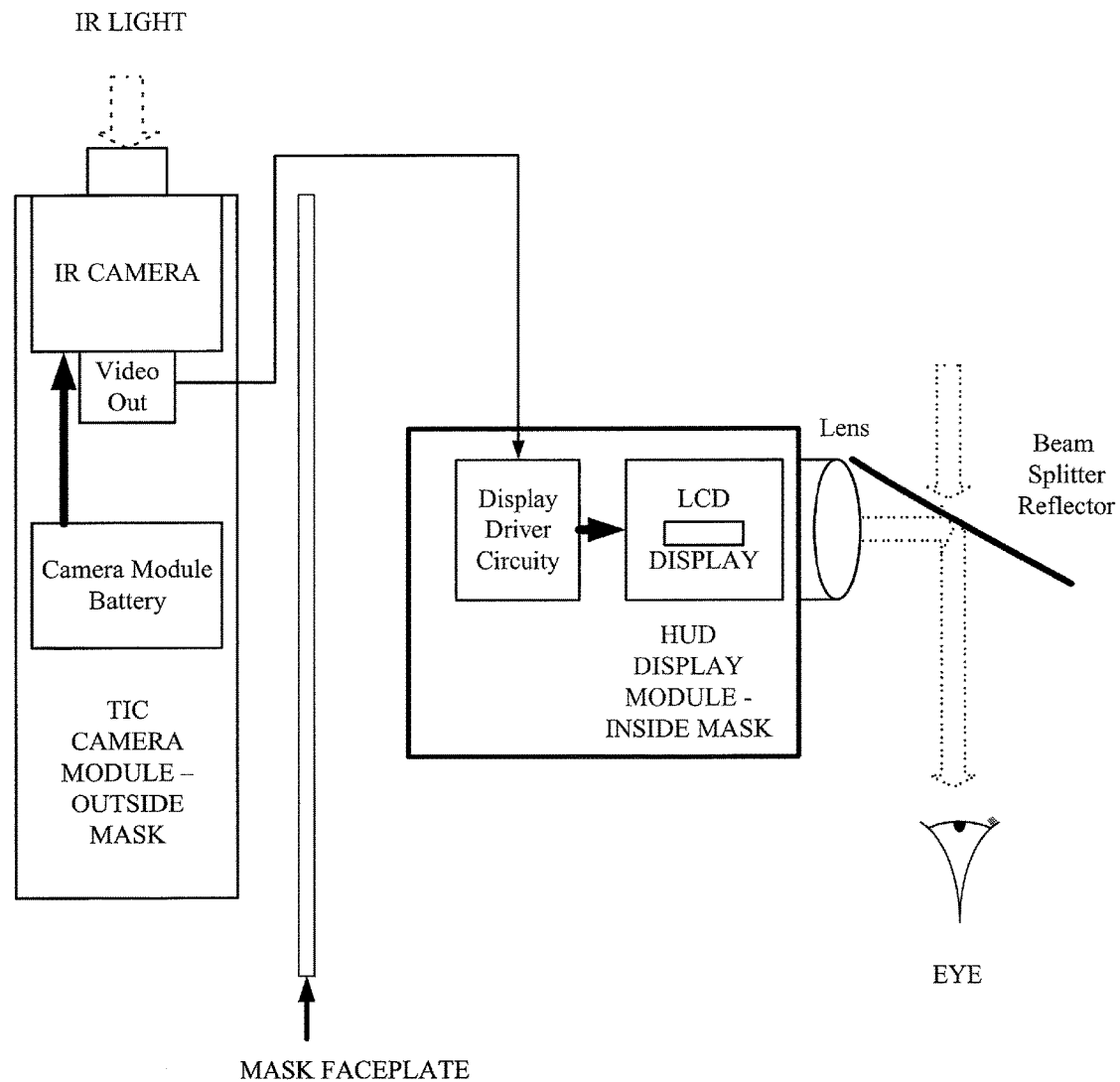
FIG. 14E is a block diagram depicting an embodiment of the TIC-HUD with a beam splitter reflector.

FIG. 14D depicts a block diagram of the wired embodiment of the TIC-HUD with a beam splitter reflector. The TIC Module has an internally mounted IR Camera and a battery, labeled 'Camera Module Battery' in the diagram. Alternatively, the use of a high temperature ribbon cable or flex cable allows the TIC Module to be powered by the central SCBA battery, thereby eliminating the need for the 'Camera Module Battery', thereby reducing size and saving weight. The IR Camera captures infrared (IR) spectrum images from its field of view in the direction it is facing. The TIC Module transmits the output of the IR Camera to the HUD Module using a high temperature ribbon cable or Flex-Strip, which is routed around the edge of the facemask visor and connected to the HUD Module. In this embodiment, the HUD Module does not require a Wireless Video Receiver or a battery. The flex cable would be thin enough to run underneath the SCBA facemask visor seal without compromising the integrity of the seal.

The HUD Module contains an LCD, OLED or other type of graphic display, Display Driver Circuitry, Display Optics and a Beam Splitter Reflector. The power for the HUD Module is provided by the TIC batteries (Camera Module Battery). The HUD Module receives the IR Camera output and the image is processed through the Display Driver Circuitry and then displayed on the LCD Display. The HUD Module is mounted inside the facemask, in a position that does not obscure the operator's forward vision, such as over the bridge of the operator's nose. A Beam Splitter Reflector would be attached to the HUD and positioned over the operator's eye to reflect the image from the LCD Display. The HUD optics would include a Lens or Lens Assembly with the field of view (FOV) and the magnification factor adjusted to allow for a display of the visible scene that would cause the least amount of eye fatigue. Referring to the Beam Splitter Reflector, it would be positioned over the operator's eye so that the operator would be able the reflected image of the HUD LCD Display when the display is on and view the visible scene through this reflector when the HUD LCD Display is off. A brightness adjustment of the TIC camera output could be done automatically by incorporating ambient light detection circuitry into the external TIC housing or manually using external buttons on the TIC housing. If the SCBA system accommodates a connection to the TIC-HUD though the SCBA Interface connector, a Microphone and Amplifier could be used to transfer the firefighter's voice to the SCBA system.

Figure 15B:
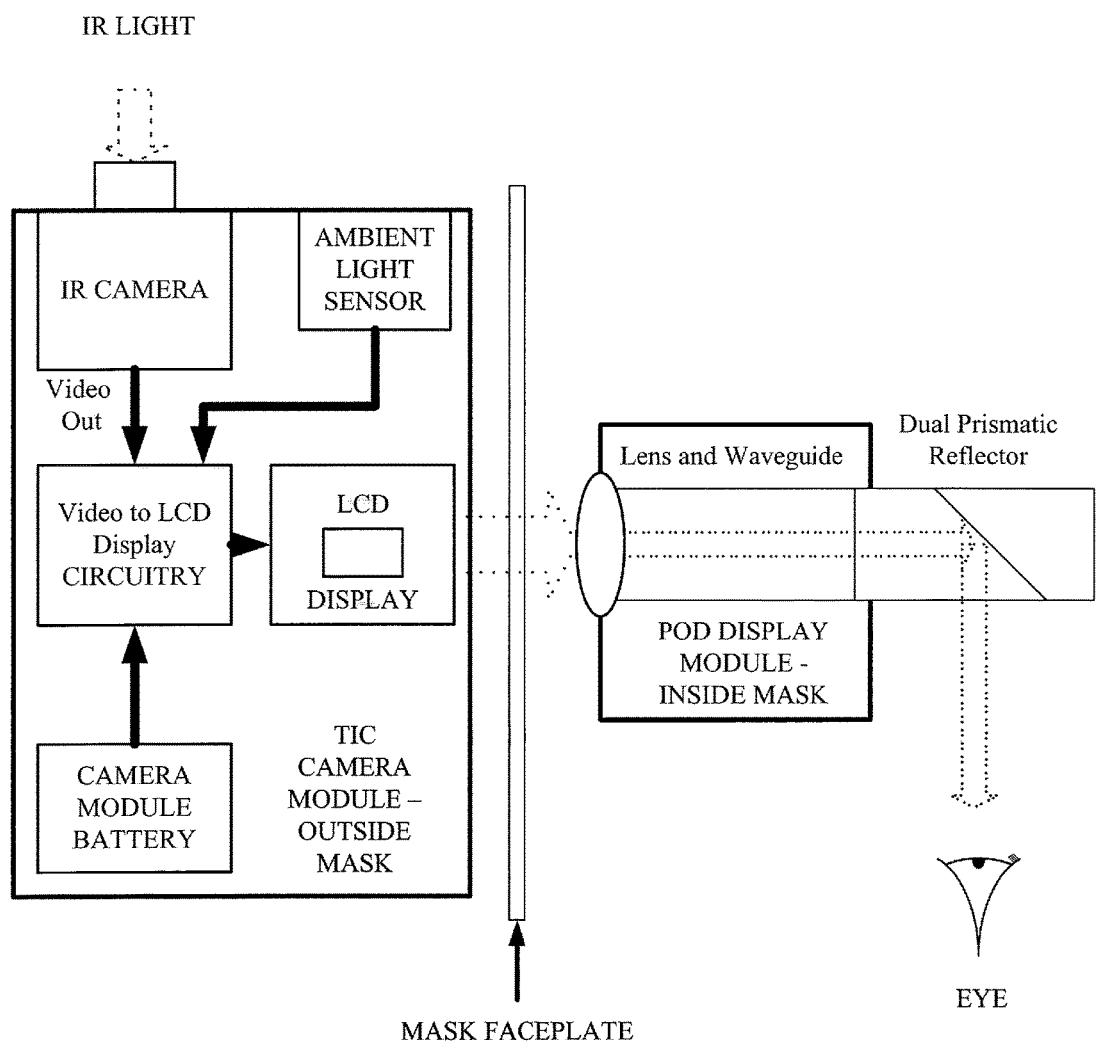
FIG. 15B is block diagram of the Thermal Imaging Camera with Passive Optical Display (TIC-POD) with a dual prismatic reflector.

Referring to FIG. 15A, a passive optical display (POD) may be mounted inside the facemask; this diagram has been expanded in FIG. 15B.

Referring to FIG. 15B, a passive optical display (POD) may be mounted inside the facemask. This embodiment provides an external, battery powered (Camera Module Battery), TIC module mounted on the side of the SCBA facemask incorporating an an IR Camera and LCD display. The LCD Display is aligned with purely passive optical display (POD) mounted inside the SCBA facemask. The POD incorporates a Lens, Optical Waveguide and Dual Prismatic Reflector. One advantage of this embodiment is that it eliminates all the inside mask electronics, batteries, video transport, active displays panels and hardware mounts that are needed to support the inside mask electronics. The TIC Module incorporates an LCD, OLED or similar display into the module housing on the outside of the facemask and transmitted directly thru the clear mask faceplate. The camera output from the TIC Module is displayed on an LCD, OLED or similar display incorporated into the module housing on the outside of the facemask and transmitted directly through the clear mask faceplate. The displayed image is acquired inside the facemask by the POD using Lens mated to an Optical Wave Guide/light pipe. The POD provides a reflected image of the TIC output using a 'see-through' Dual Prismatic Reflector. The Dual Prismatic Reflector is positioned over the operator's eye so that the operator would be able view the visible scene through this reflector when the TIC display is off. The magnification factor of the POD optics is be designed to for a display of the visible scene that would that would approximate the actual size of objects in the visible scene and cause the least amount of eye fatigue. The brightness of the image displayed on the POD would be adjustable through adjustment of the backlight brightness of the LCD display incorporated in the external TIC housing. Ambient light detection circuitry integrated into the TIC Module automatically adjusts the brightness of the image displayed on the POD, is through adjustment of the backlight brightness of the LCD Display.

Figure 16B:
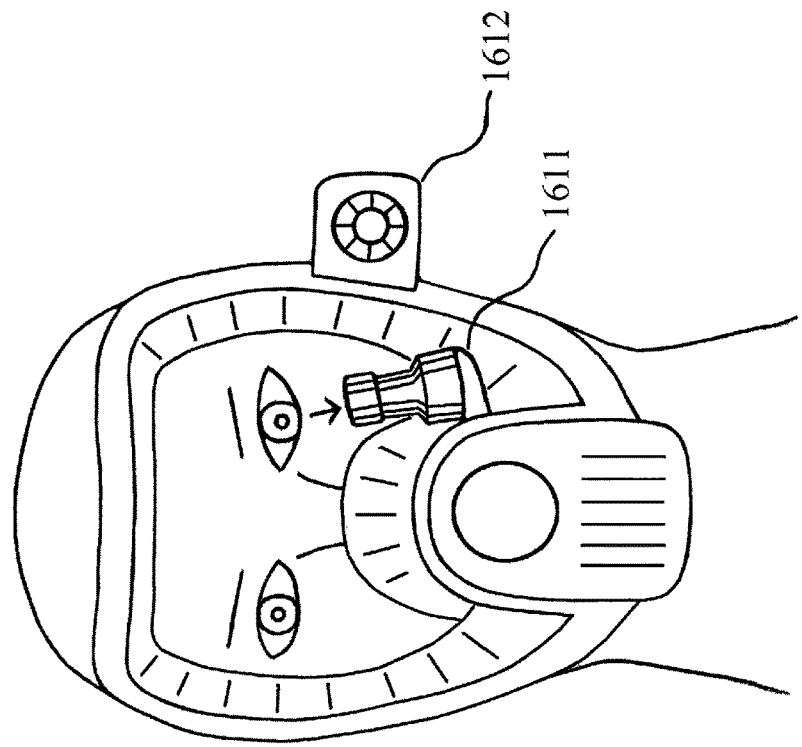
FIG. 16B is a front view of FIG. 16A.
Figure 16A:
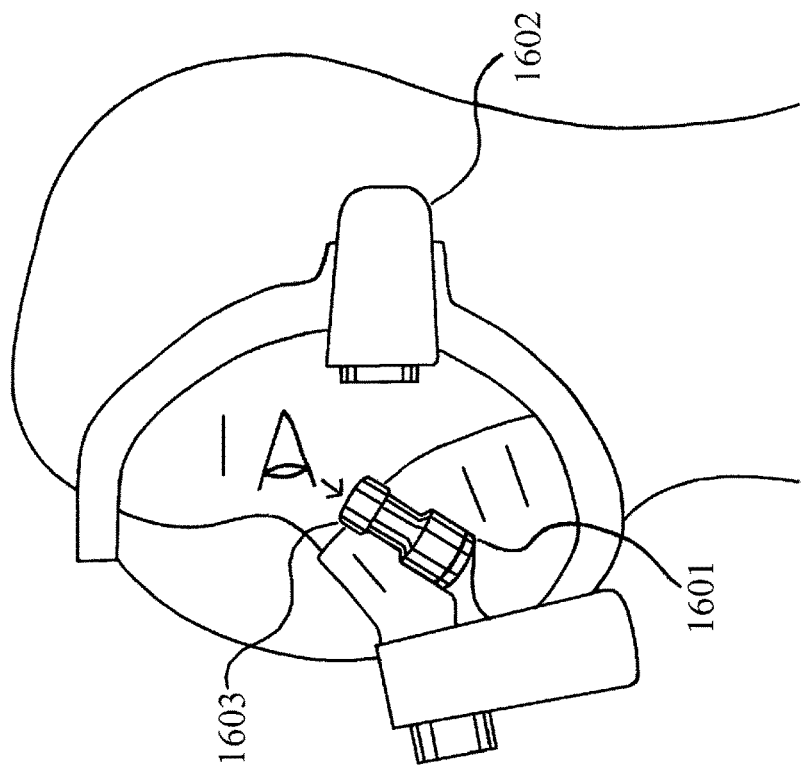
FIG. 16A is a pictorial of a side view of the Monocular Lens HUD embodiment of the TIC-HUD mounted on an SCBA facemask.

FIG. 16A illustrates a side view of an option for mounting the Monocular Lens HUD version of the TIC-HUD on an SCBA facemask. In the illustration, 1601 shows the position of the HUD Module and 1602 shows the position of the TIC Module. 1603 shows the position of the HUD lens assembly with the arrow indicating the viewing direction. The focal length of the lens assembly is adjusted so that the firefighter can look down at the HUD display and then back up at the surrounding environment without refocusing the eye.

FIG. 16B illustrates a front view of an option for mounting the Monocular Lens HUD version of the TIC-HUD on an SCBA facemask. In the illustration, 1611 shows the position of the HUD Module and 1612 shows the position of the TIC Module.

Figure 16C:
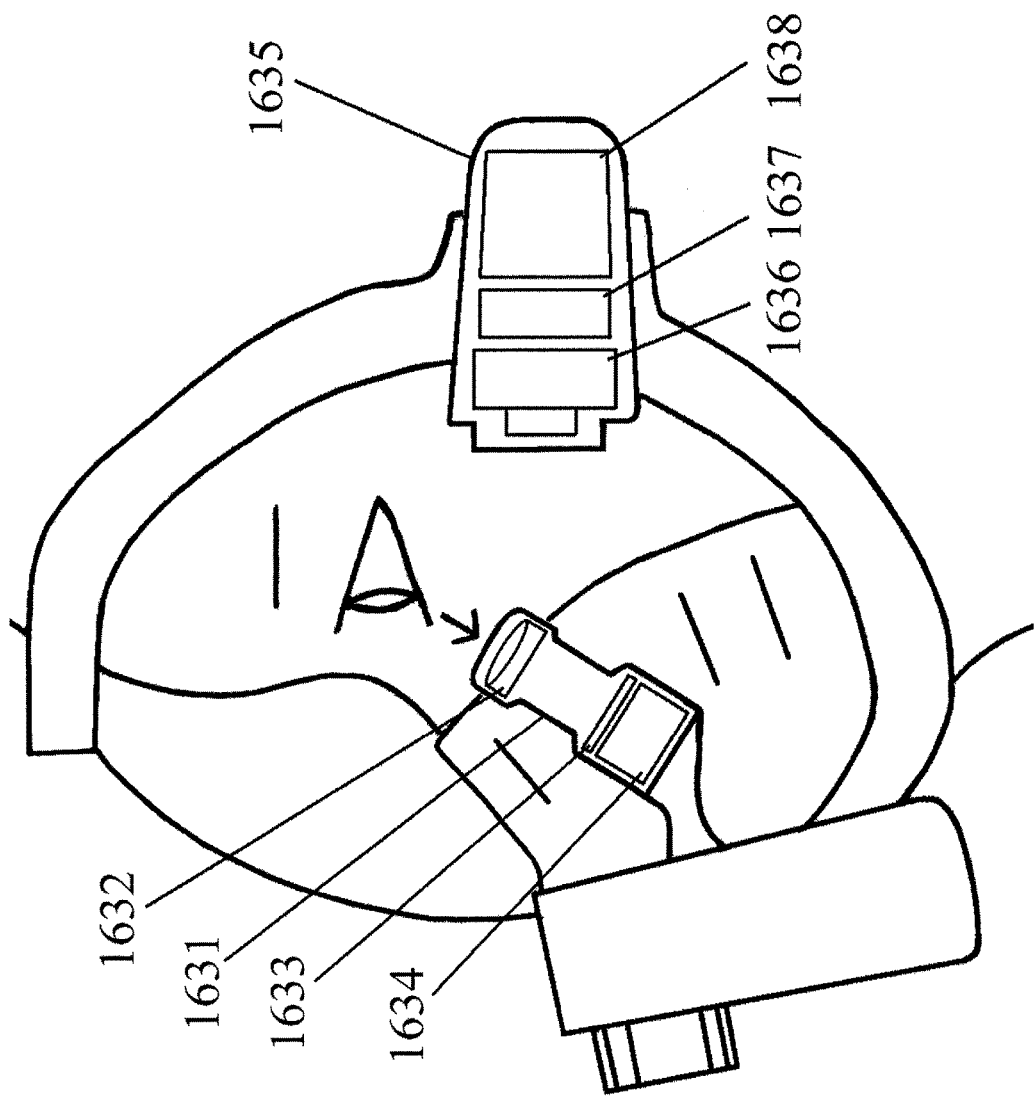
FIG. 16C is a pictorial cross section view of FIG. 16A.

FIG. 16C illustrates a cross sectional side view of an option for mounting the 'Monocular Lens HUD' version of the TIC-HUD on an SCBA facemask. In the illustration, 1631 shows the housing of the HUD Module, 1632 shows the position of the lens assembly within the HUD housing, 1633 shows the position of the display assembly within the HUD housing and 1634 shows the position of the HUD electronics assembly within the HUD housing. In the illustration, 1635 shows the housing of the TIC module, 1636 shows the position of the IR camera within the TIC housing, 1637 shows the position of the TIC electronics assembly within the TIC housing and 1638 shows the position of the battery pack within the TIC housing.

Figure 16D:
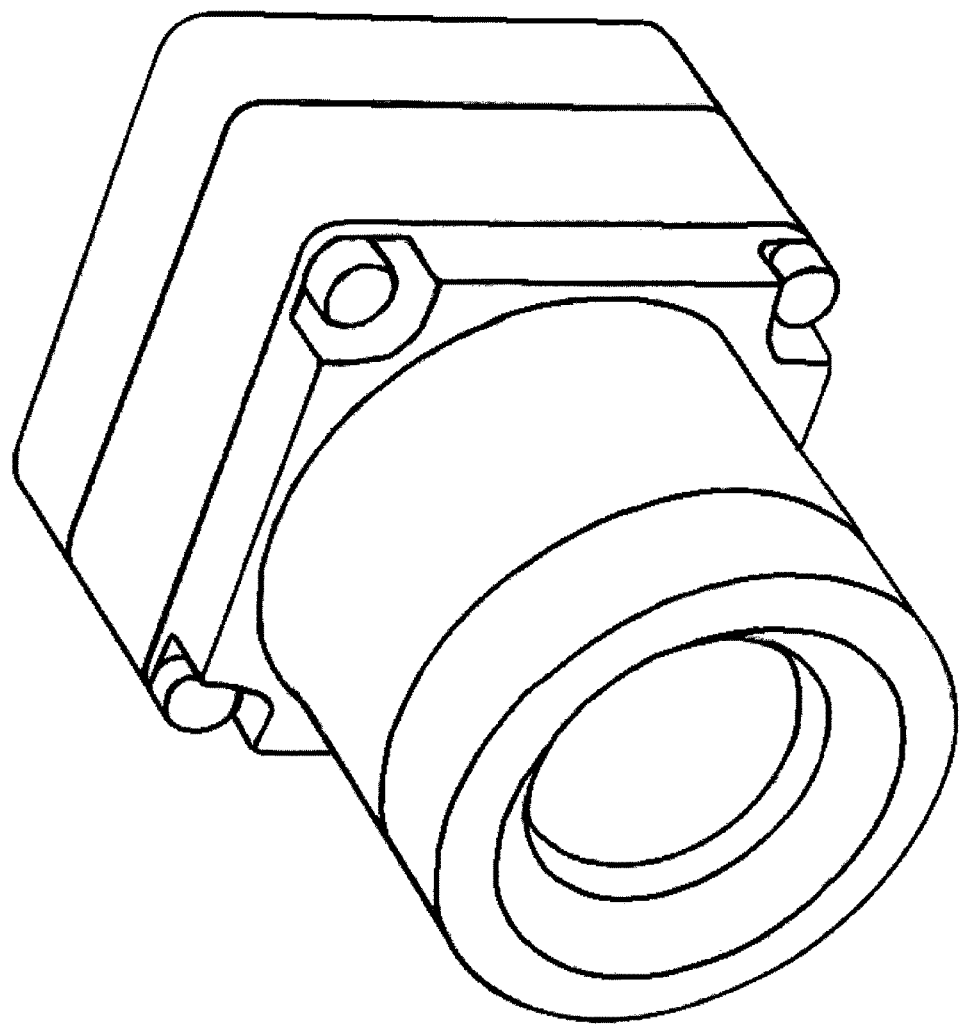
FIG. 16D is a pictorial of the TIC component.

FIG. 16D depicts an example of a commercially available IR camera design. This would mount in the TIC housing.

FIG. 16E depicts an example of a quick-disconnect means to attach the TIC Module to the SCBA facemask. The quick-disconnect mount would allow easy installation and removal of the TIC Module from side of the SCBA facemask. This allows the TIC Module, which is the most expensive component, to be shared and used by several firefighters on different shifts. At most fire departments, facemasks are fit-tested and personal to each firefighter. When a firefighter finishes his shift, the quick-disconnect mount enables the firefighter to simply unsnap the TIC Module from his facemask and place it in a battery recharging stand. The firefighter on the next shift can simply select a fully charged TIC Module from the recharging stand and snap it in place on the outside of his facemask. In FIGS. 16E and 16F, 1640 shows one embodiment of a mounting bracket. This mounting bracket is permanently affixed to the side of the SCBA facemask. It is attached to the facemask at the tab labeled 1642. There are two of these tabs at the top and bottom of the mounting bracket. They attach to the facemask using a bolt that runs through the tab openings. 1641 shows an example of the TIC housing. There are two spring loaded pins, 1647, built into the top and bottom of the TIC housing. These snap into the holes in the two mating tabs, 1643, in the mounting bracket. 1645 shows a rear view of the TIC Module (1641). When the TIC Module is inserted into the mounting bracket, the tab (1644) on the mounting bracket will slide into the slot (1646) at the rear of the TIC Module. This holds the rear of the TIC Module in position. To release the TIC Module from the mounting bracket, a cylindrical tool (key) would be pressed into the opposite side of the holes in the mating tabs, 1643, to compress the spring loaded pins, 1644. The TIC Module could then be pulled away from the mounting bracket.

Figure 16H:
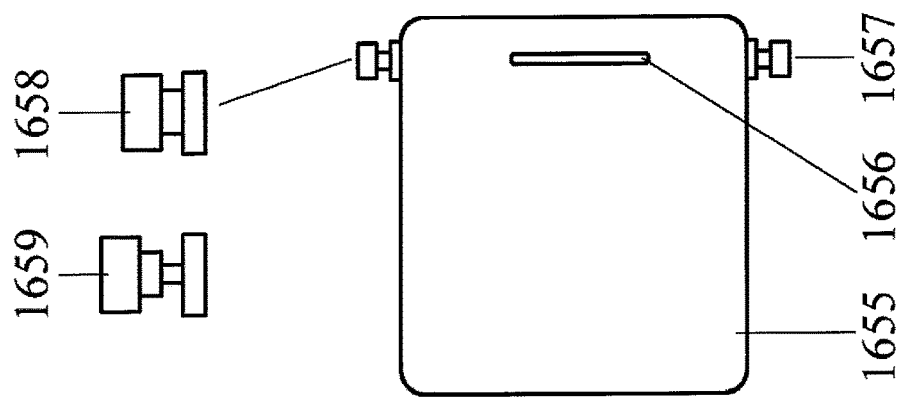
FIG. 16H is a rear view of the TIC component attachment.
Figure 16G:
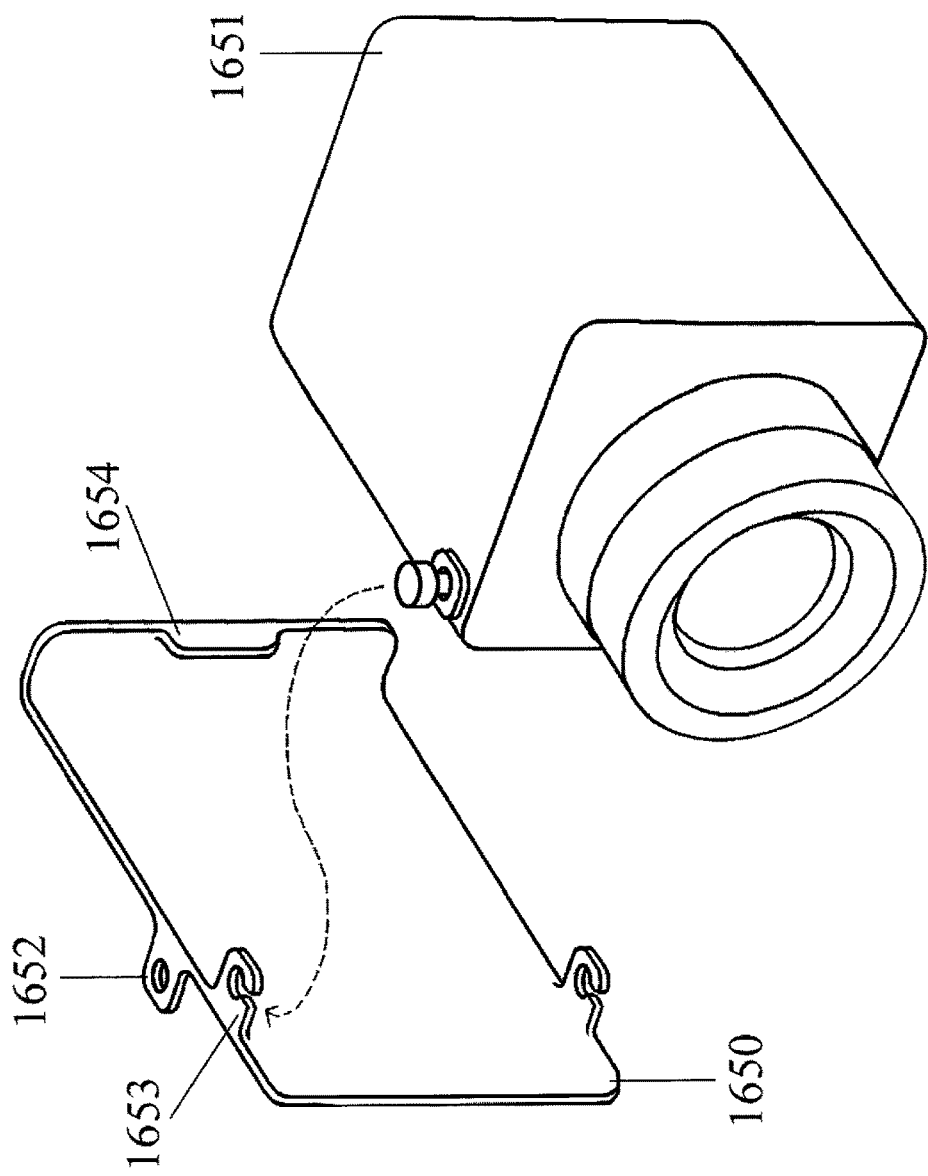
FIG. 16G is an exploded view of the TIC component attachment.

FIG. 16G depicts an example of a quick-disconnect means to attach the TIC Module to the SCBA facemask. The quick-disconnect mount would allow easy installation and removal of the TIC Module from side of the SCBA facemask. This allows the TIC Module, which is the most expensive component, to be shared and used by several firefighters on different shifts. At most fire departments, facemasks are fit-tested and personal to each firefighter. When a firefighter finishes his shift, the quick-disconnect mount enables the firefighter to simply unsnap the TIC Module from his facemask and place it in a battery recharging stand. The firefighter on the next shift can simply select a fully charged TIC Module from the recharging stand and snap it in place on the outside of his facemask. In FIGS. 16G and 16H, 1650 shows one embodiment of a mounting bracket. This mounting bracket is permanently affixed to the side of the SCBA facemask. It is attached to the facemask at the tab labeled 1652. There are two of these tabs at the top and bottom of the mounting bracket. They attach to the facemask using a bolt that runs through the tab openings. 1651 shows an example of the TIC housing. There are two spring loaded pins, 1657, built into the top and bottom of the TIC housing. These snap into the holes in the two mating slotted tabs, 1653, in the mounting bracket. 1655 shows a rear view of the TIC Module (1651). When the TIC Module is inserted into the mounting bracket, the tab (1654) on the mounting bracket will slide into the slot (1656) at the rear of the TIC Module. This holds the rear of the TIC Module in position. 1658 and 1659 show close-ups of the spring loaded pin (1657) assemblies in the locked and extended positions respectively. When the spring loaded pin is in the extended position, the thin section of the pin will allow the pin assemblies to pass through the slot in the tabs (1653) on the mounting bracket. To release the TIC Module from the mounting bracket, the heads of the spring loaded pins (1657) are pulled outwards from the TIC Module so the pins will fit through the slotted tabs (1653) and the entire TIC Module can be pulled forwards and off the mounting bracket.

Figure 17B:
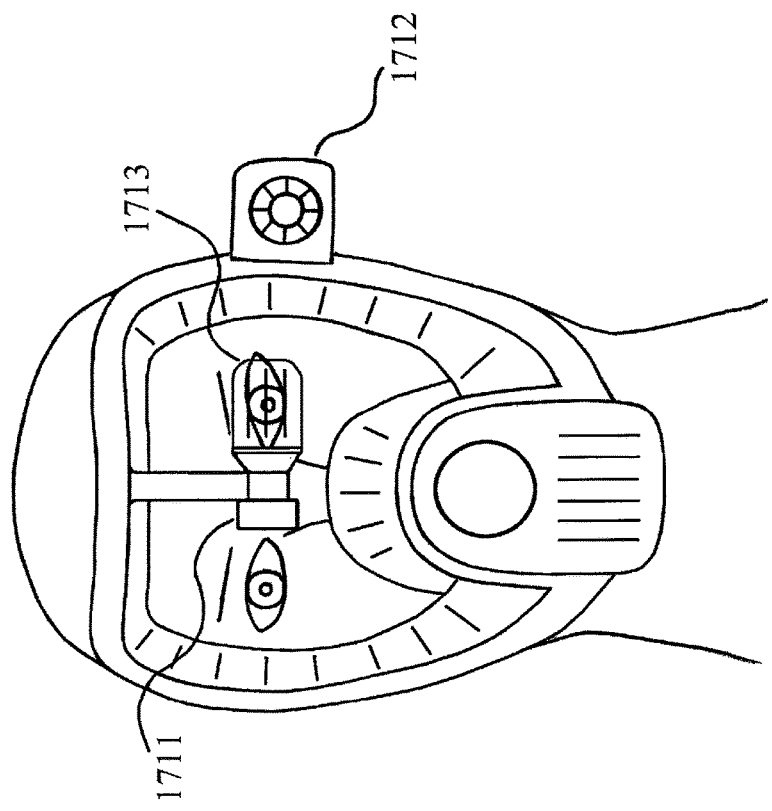
FIG. 17B is a front view of FIG. 17A.
Figure 17C:
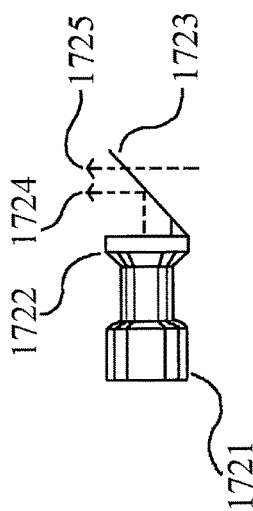
FIG. 17C is a view of the switchable reflector of FIG. 17A.
Figure 17A:
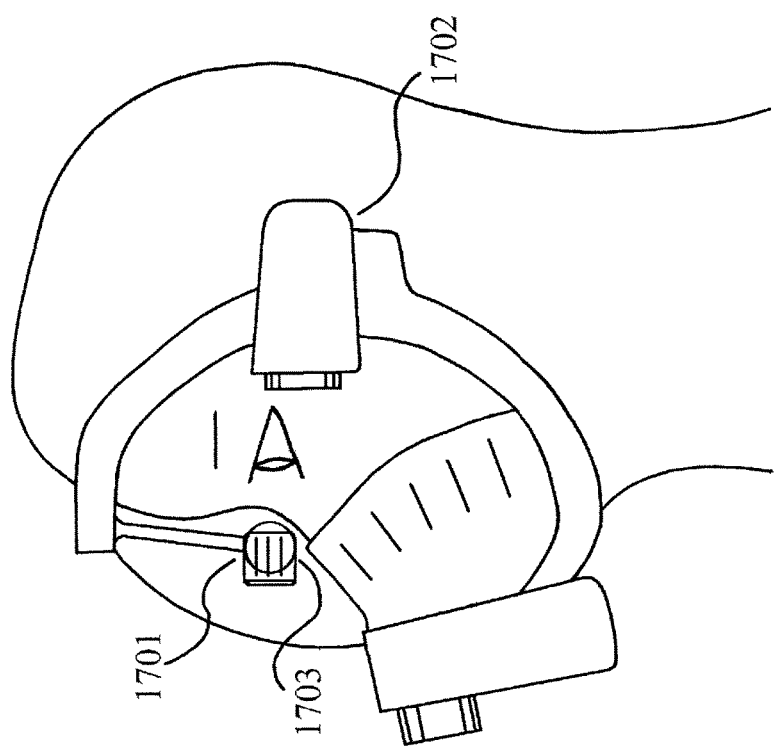
FIG. 17A is a pictorial view of the components of the TIC-HUD incorporating the Switchable Reflector HUD embodiment.

FIG. 17A illustrates a side view of an option for mounting the version of the TIC-HUD with a switchable reflector on an SCBA facemask. In the illustration, 1701 shows the position of the HUD Module and 1702 shows the position of the TIC Module. 1703 shows the position of the HUD switchable reflector in front of the firefighter's eye.

FIG. 17B illustrates a front view of an option for mounting the version of the TIC-HUD with a switchable reflector on an SCBA facemask. In the illustration, 1711 shows the position of the HUD Module and 1712 shows the position of the TIC Module. 1713 shows the position of the HUD switchable reflector in front of the firefighter's eye.

FIG. 17C illustrates a top view of the HUD Module with switchable reflector alone. In the illustration, 1721 shows the location of the LCD display within the HUD Module. 1722 shows the location of the HUD lens assembly. 1723 shows the location of the switchable reflector. When the switchable reflector is operating in reflection mode, the light will take the path shown by arrow 1724 and the image from the TIC will be visible to the firefighter. When the see-through reflector is operating in transparent mode, the light will the path shown by arrow 1725 and the surrounding environment will be visible to the firefighter.

FIG. 17D illustrates a side view of an option for mounting the version of the TIC-HUD with a beam splitter reflector on an SCBA facemask. In the illustration, 1731 shows the position of the HUD Module and 1732 shows the position of the TIC Module. 1733 shows the position of the HUD beam splitter reflector in front of the firefighter's eye.

FIG. 17E illustrates a front view of an option for mounting the version of the TIC-HUD with a beam splitter reflector on an SCBA facemask. In the illustration, 1741 shows the position of the HUD Module and 1742 shows the position of the TIC Module. 1743 shows the position of the HUD beam splitter reflector in front of the firefighter's eye.

FIG. 17F illustrates a top view of the HUD Module with beam splitter reflector alone. In the illustration, 1751 shows the location of the LCD display within the HUD Module. 1752 shows the location of the HUD lens assembly. 1753 shows the location of the beam splitter reflector. The arrow 1754 shows the path of light from the HUD lens where it is blended with the light from the ambient environment and reflected towards the firefighter's eye. The firefighter will see an image from the output of the TIC camera overlaid on the view of the surrounding environment. If the surrounding environment is obscured by smoke then only the TIC image will be visible.

Figure 17G:
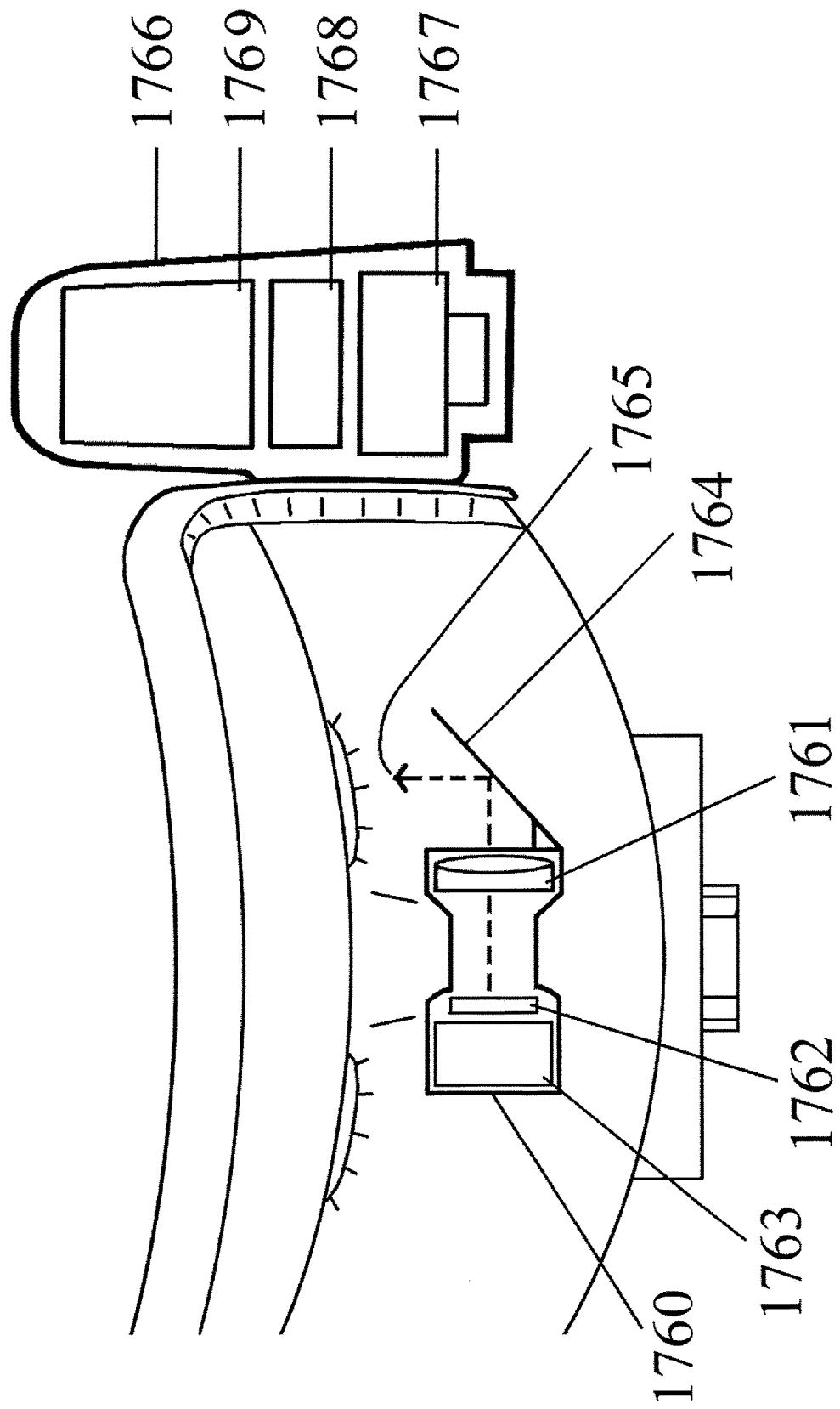
FIG. 17G is a top view of switchable reflector and TIC.

FIG. 17G illustrates a cross sectional top view of an option for mounting the TIC-HUD with a switchable reflector on an SCBA facemask. In the illustration, 1760 shows the housing of the HUD Module, 1761 shows the position of the lens assembly within the HUD housing, 1762 shows the position of the display assembly within the HUD housing, 1763 shows the position of the HUD electronics assembly within the HUD housing and 1764 shows the position of the switchable reflector attached to the HUD housing. The arrow 1765 shows the path the light travels through the HUD. It is emitted by the display assembly (1762), focused by the lens assembly (1761) and then reflects off the switchable reflector (1764) into the eye. In the illustration, 1766 shows the housing of the TIC module, 1767 shows the position of the IR camera within the TIC housing, 1768 shows the position of the TIC electronics assembly within the TIC housing and 1769 shows the position of the battery pack within the TIC housing.

Figure 17H:
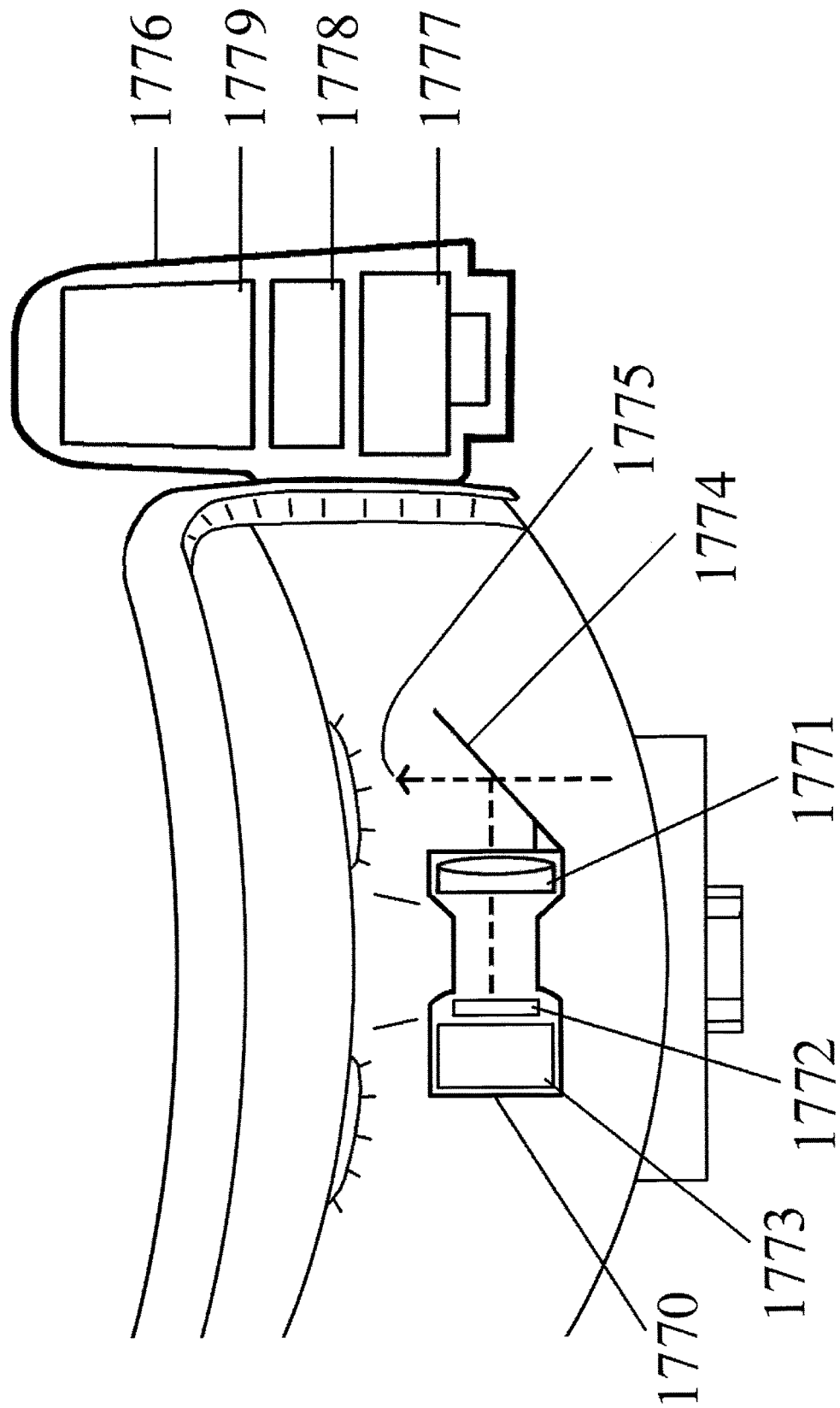
FIG. 17H is a top view of the beam splitter and TIC.

FIG. 17H illustrates a cross sectional top view of an option for mounting the TIC-HUD with a beam splitter reflector on an SCBA facemask. In the illustration, 1770 shows the housing of the HUD Module, 1771 shows the position of the lens assembly within the HUD housing, 1772 shows the position of the display assembly within the HUD housing, 1773 shows the position of the HUD electronics assembly within the HUD housing and 1774 shows the position of the switchable reflector attached to the HUD housing. The arrow 1775 shows the path the light travels through the HUD. It is emitted by the display assembly (1772), focused by the lens assembly (1771) and then reflects off the beam splitter reflector (1764) where it combines with ambient light and then into the eye. In the illustration, 1776 shows the housing of the TIC module, 1777 shows the position of the IR camera within the TIC housing, 1778 shows the position of the TIC electronics assembly within the TIC housing and 1779 shows the position of the battery pack within the TIC housing.

Figure 18B:
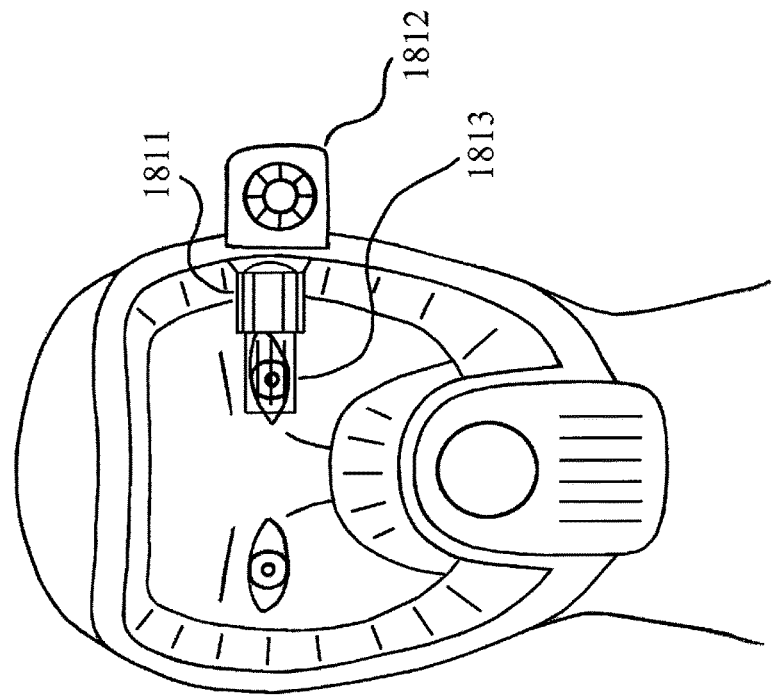
FIG. 18B illustrates the components of the TIC-HUD incorporating the POD-HUD embodiment with a dual prismatic reflector mounted on an SCBA facemask.
Figure 18C:
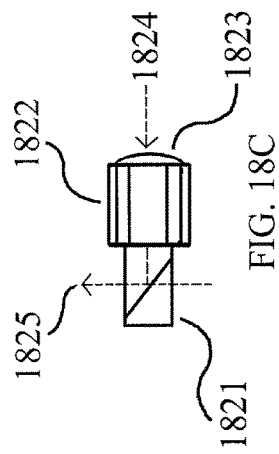
FIG. 18C illustrates the components of the TIC-HUD incorporating the POD-HUD embodiment with a dual prismatic reflector mounted on an SCBA facemask.
Figure 18A:
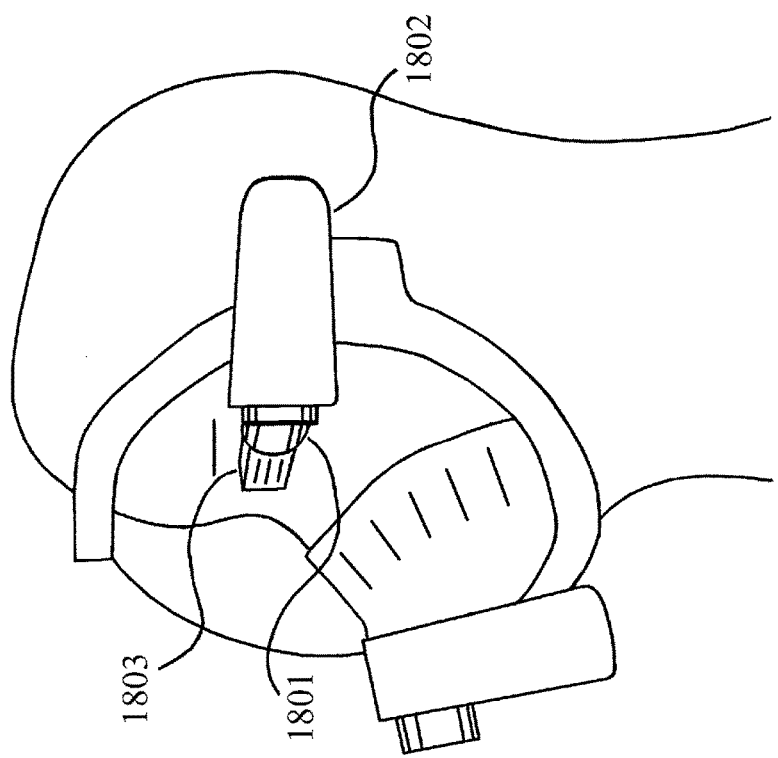
FIG. 18A illustrates the components of the TIC-HUD incorporating the POD-HUD embodiment with a dual prismatic reflector mounted on an SCBA facemask.

FIG. 18A illustrates a side view of an option for mounting the TIC-POD on an SCBA facemask. In the illustration, 1801 shows the position of the POD Module and 1802 shows the position of the TIC Module. 1803 shows the position of the HUD prismatic reflector in front of the firefighter's eye.

FIG. 18B illustrates a front view of an option for mounting the TIC-POD on an SCBA facemask. In the illustration, 1811 shows the position of the POD Module and 1812 shows the position of the TIC Module. 1813 shows the position of the HUD prismatic reflector in front of the firefighter's eye.

FIG. 18C illustrates a top view of the TIC-POD. In the illustration, 1821 shows the location of the dual prismatic reflector. 1822 shows the location of the optical waveguide within the POD Module. 1823 shows the location of the light gathering lens. This faces towards the LCD display on the side of the TIC when the POD is in the mounted position. The arrow 1824 shows how light from the TIC LCD display flows through the lens and into the optical waveguide. The arrow 1825 shows the path of light out of the optical waveguide where it is blended with the light from the ambient environment and reflected towards the firefighter's eye. The firefighter will see an image from the output of the TIC camera overlaid on the view of the surrounding environment. If the surrounding environment is obscured by smoke then only the TIC image will be visible.

Figure 18D:
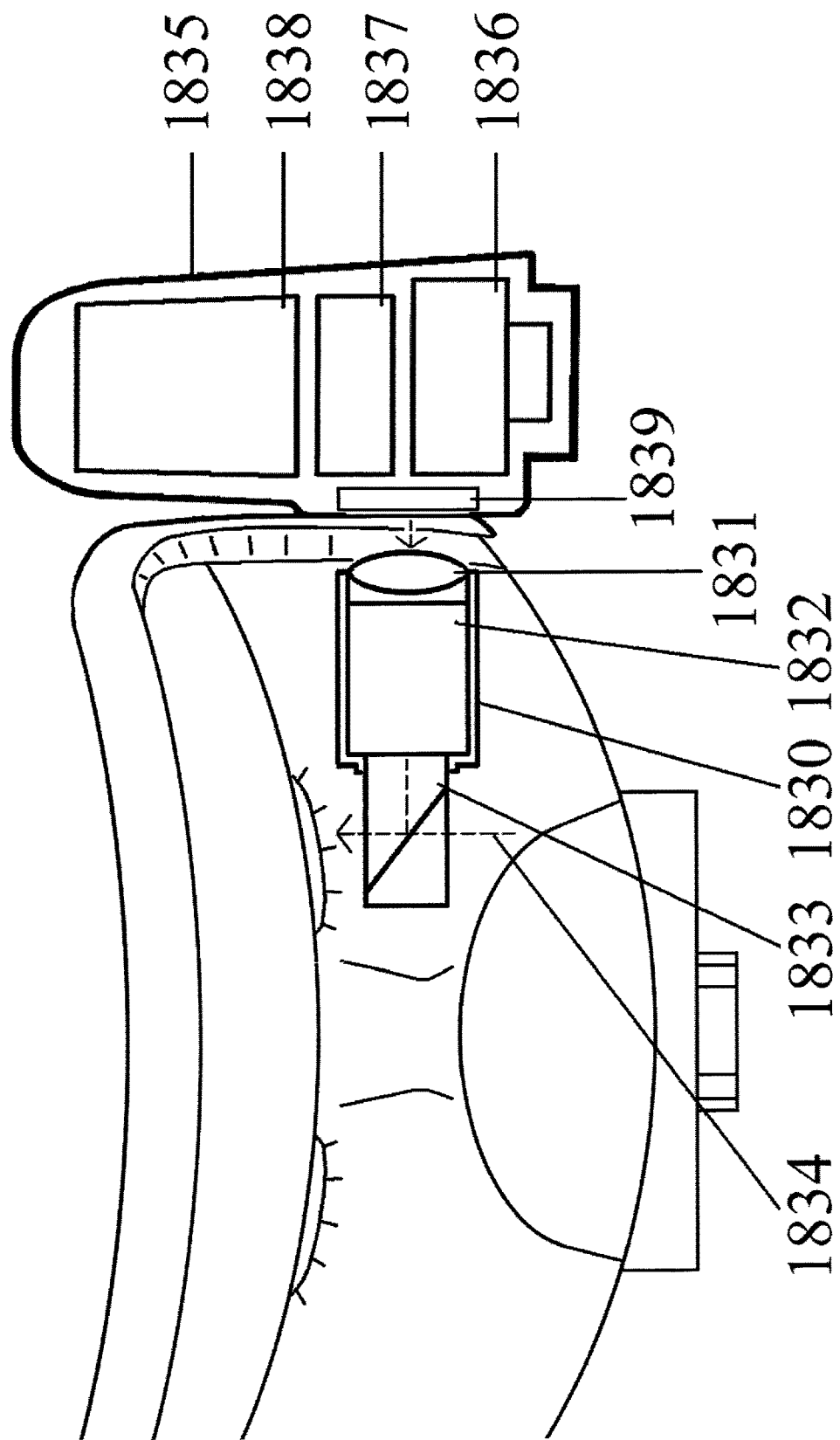
FIG. 18D illustrates the components of the TIC-HUD incorporating the POD-HUD embodiment with a dual prismatic reflector mounted on an SCBA facemask.

FIG. 18D illustrates a cross sectional top view of an option for mounting the TIC-POD on an SCBA facemask. In the illustration, 1830 shows the housing of the POD Module, 1831 shows the position of the lens assembly within the POD housing, 1832 shows the position of the optical waveguide within the POD housing and 1833 shows the position of the dual prismatic reflector attached to the POD housing. In the illustration, 1835 shows the housing of the TIC module, 1836 shows the position of the IR camera within the TIC housing, 1837 shows the position of the TIC electronics assembly within the TIC housing, 1838 shows the position of the battery pack within the TIC housing and 1839 show the position of the display assembly on the side of the TIC housing. The arrow 1834 shows the path the light travels from the TIC and then through the POD. It is emitted by the display assembly mounted on the side of the TIC (1839), passes through the facemask visor, is focused by the lens assembly (1831), is carried by the optical waveguide (1832) to the dual prismatic reflector (1833) where it combines with ambient light and then reflects into the eye.

Figure 19A:
FIG. 19A illustrates an enhancement that applies to all embodiments of the TIC-HUD and allows the TIC-HUD to receive and display information from the SCBA electronics.
Figure 19B:
FIG. 19B illustrates an enhancement that applies to all embodiments of the TIC-HUD and allows the TIC-HUD to receive and display information from the SCBA electronics.
Figure 19C:
FIG. 19C illustrates an enhancement that applies to all embodiments of the TIC-HUD and allows the TIC-HUD to receive and display information from the SCBA electronics.

FIGS. 19A, 19B and 19C illustrate an enhancement that applies to all embodiments of the TIC-HUD. In SCBA systems that can accommodate it, the TIC-HUD can be connected to the SCBA main electronics and receive information from the SCBA electronics. This connection can be achieved through wired or wireless means. When the TIC-HUD is connected to the SCBA electronics and receives air tank pressure data from the SCBA electronics, it will display the air tank pressure and a calculation of the remaining air time on the HUD as an overlay on the image from the TIC camera output. FIG. 19A shows an example display of SCBA air tank pressure and the remaining air time. On SCBA systems that are equipped with telemetry systems the TIC-HUD will be able to display messages from the telemetry system on the HUD as an overlay on image from the TIC camera output. FIG. 19B shows an example display of an Evacuate (EVAC) request from the SCBA telemetry system. FIG. 19C shows an example display of an Personnel Accountability Request (PAR) from the SCBA telemetry system.

Figure 20B:
FIG. 20B illustrates an enhancement that applies to all embodiments of the TIC-HID and allows the TIC-HUD to receive and display building layout images information from the SCBA systems that are equipped with remote telemetry.
Figure 20A:
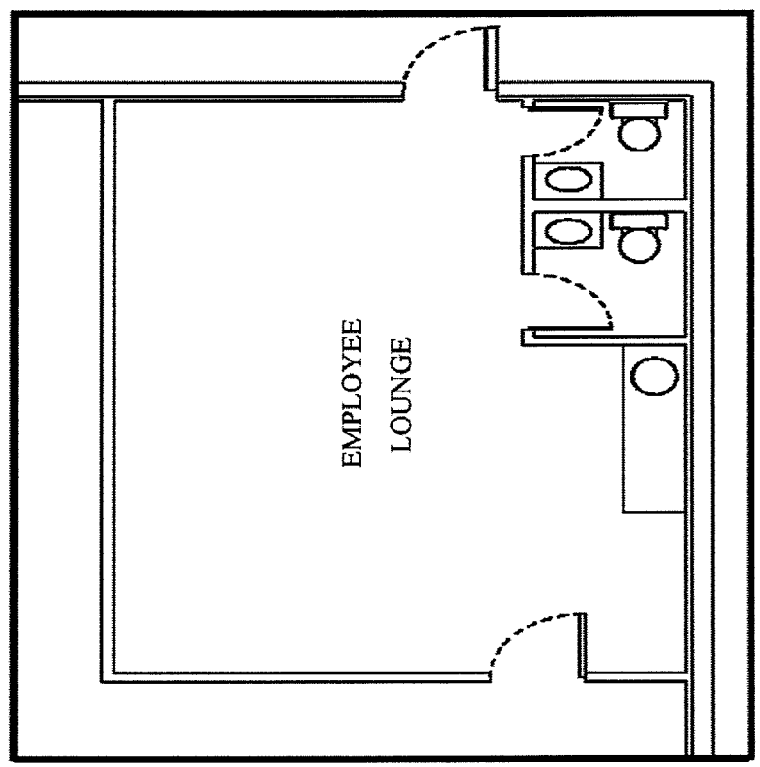
FIG. 20A illustrates an enhancement that applies to all embodiments of the TIC-HID and allows the TIC-HUD to receive and display building layout images information from the SCBA systems that are equipped with remote telemetry.

FIGS. 20A and 20B illustrate an enhancement that applies to all embodiments of the TIC-HID. On SCBA systems that are equipped with a remote telemetry system that can accommodate a wired or wireless connection to the TIC-HUD. The TIC-HUD will have the ability to receive and display a graphical representation a building layout received by the SCBA system from the telemetry system and transferred through the SCBA system's connection to the TIC-HUD. FIG. 20A shows an example of how a graphical representation of a building layout would appear on the HUD display. FIG. 20B shows an example of a normal TIC-HUD display image. The firefighter would have the option of selecting either view using a button on the TIC or selecting a view that alternates between FIG. 20A and FIG. 20B.

Figure 21:
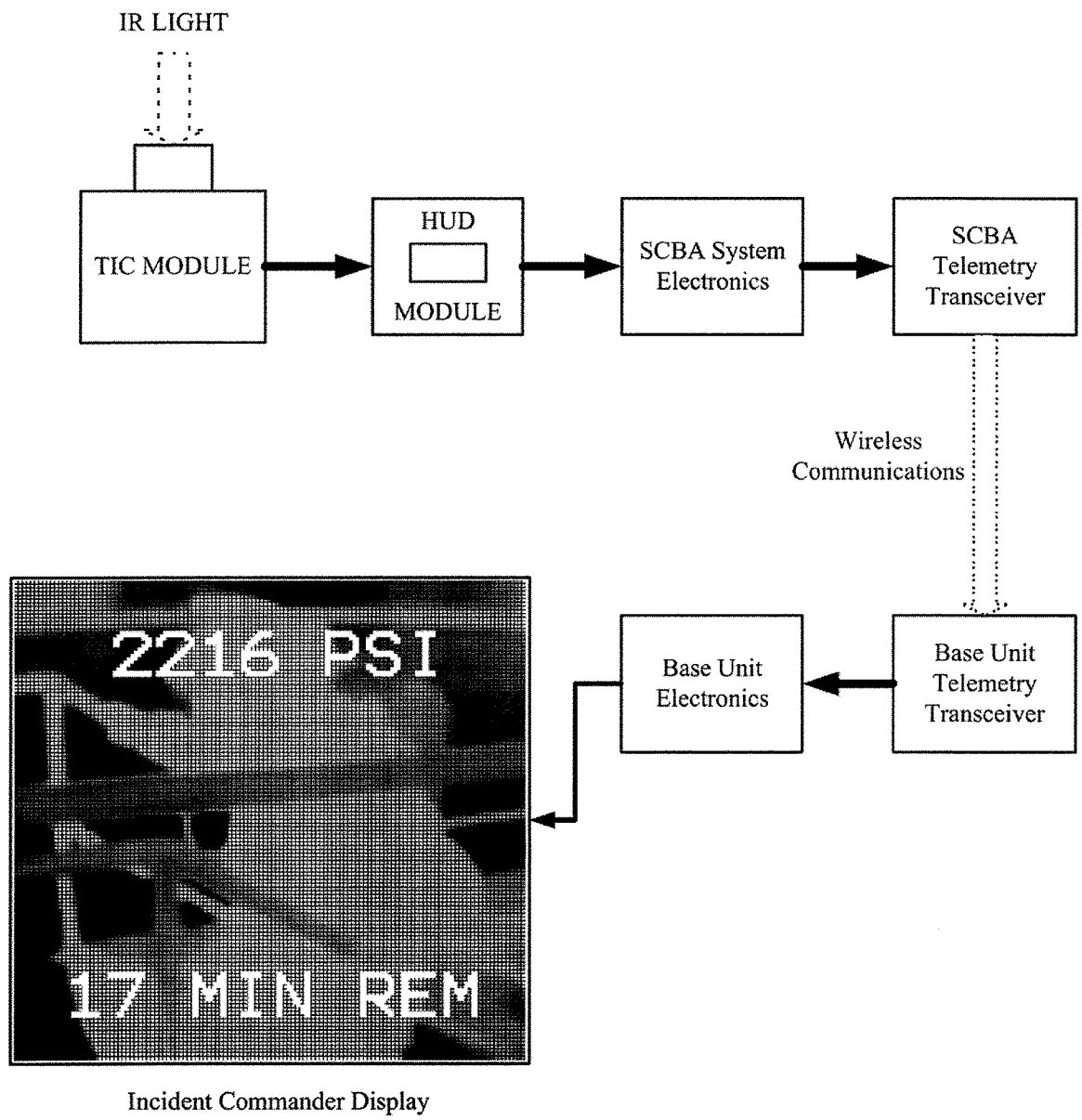
FIG. 21 depicts a block diagram of the embodiment of the TIC-HUD to allow an image or video captured by the IR camera of the TIC module to be viewed remotely on the display of a telemetry system base unit.

FIG. 21 depicts a block diagram of the embodiment of the TIC-HUD to allow an image or video captured by the IR camera of the TIC module to be viewed by the incident commander using the display of a remote telemetry system. This applies to SCBA systems that can accommodate a wired or wireless connection to the TIC-HUD and are equipped with a remote telemetry system. In the diagram, the IR images captured by the TIC module are relayed to the SCBA electronics which then uses its telemetry transceiver to relay them to the base unit telemetry transceiver. The base unit electronics receives the images for the TIC-HUD from using its telemetry transceiver and then displays them to the incident command on the base unit display.

The Emergency Locator Transmitter (ELT) Module is a non NFPA mandated component. When activated, it emits a signal that can be tracked using a matching tracking system. It is controlled directly by the BAC module.

The Mobile Public Safety Band Radio (RADIO) Module is a non NFPA mandated component. It provides an interface to an external radio. When the radio is connected, audio from the radio is routed to the VAS speaker in the MPM, voice audio from the HUD microphone is routed to the radio transmitter and the PTT button in the MPM is used to control the radio transmitter.

Figure 6:
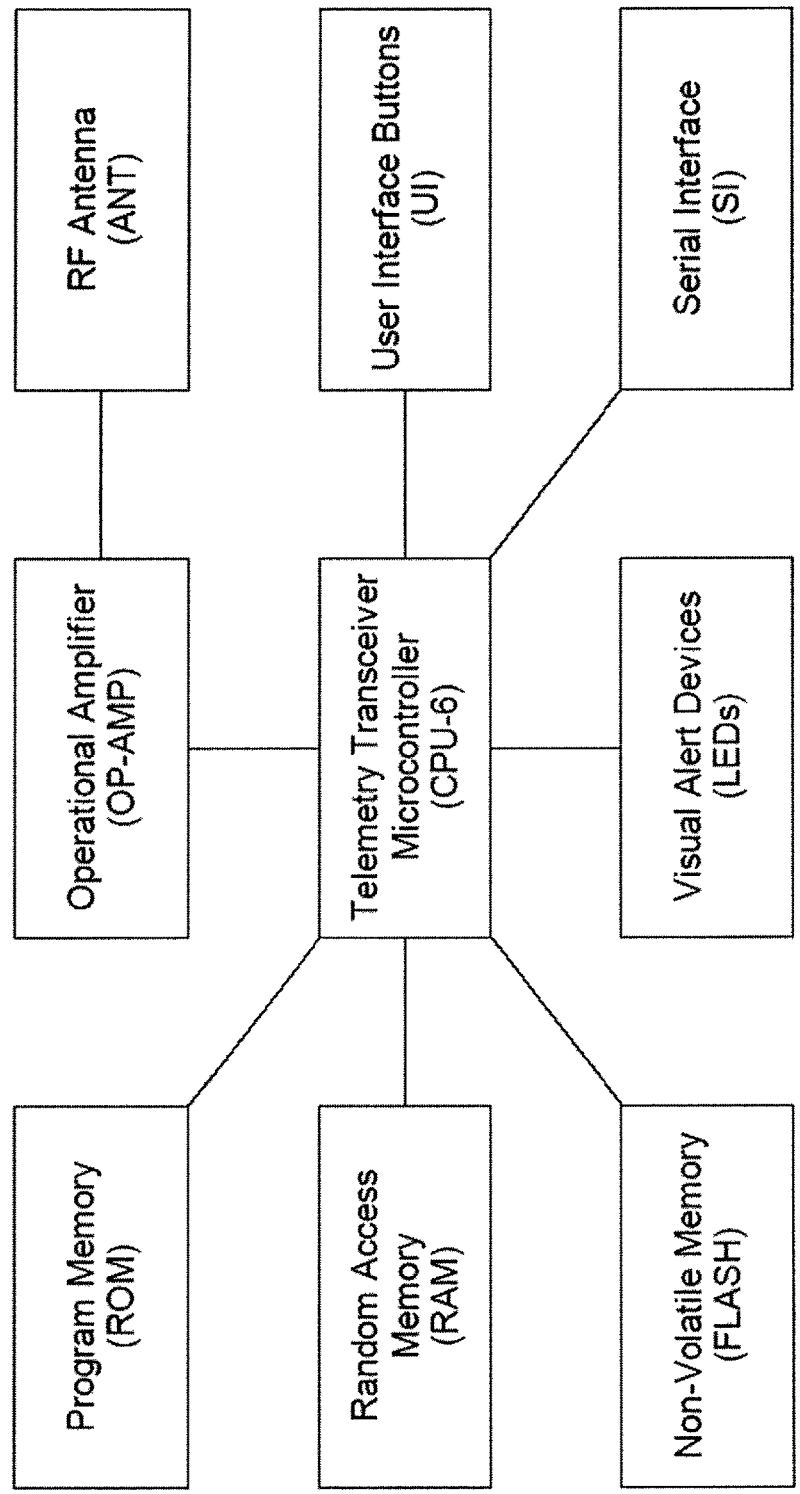
FIG. 6 is a diagram of the components of the Telemetry Transceiver (TT) Module of the instant invention.

Telemetry Transceiver (TT) Module is a non NFPA mandated component. It contains a radio transceiver and RF antenna that are used to relay telemetry data between the SCBA electronics and a remote base station during operation. It contains visual indicators to show the telemetry system status. It communicates with the BAC module through a serial interface. The primary components of this module are shown in FIG. 6.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A method improving a Self Contained Breathing Apparatus (SCBA) having a full facemask defining an interior inside and an exterior outside comprising the steps of:
    attaching a mounting bracket to the outside of the SCBA facemask, said mounting bracket having an upper tab and a lower tab;
    releasably securing a Thermal-Imaging Camera (TIC) module to said mounting bracket, said TIC module having an upper spring loaded pin operatively associated with said mounting bracket upper tab, and a lower spring loaded pin operatively associated with said mounting bracket lower tab, wherein said upper and lower spring loaded pins allow a quick release of said TIC from one SCBA facemask having a mounting bracket for transfer to another SCBA facemask having a mounting bracket on the outside of a SCBA facemask;
    positioning a Heads-Up-Display (HUD) module with a monocular lens and a field of view magnification factor on the inside of said SCBA facemask;
    wirelessly transferring images, optically or by radio frequency, from said TIC module positioned outside said SCBA facemask through said facemask to said HUD module positioned inside said SCBA facemask;
    wherein said SCBA facemask is not altered or breached and said spring loaded pins allows the transfer of said TIC module and said HUD module to other SCBA facemasks without modification to the SCBA facemask seals or front faceplate.

2. The method improving an SCBA according to claim 1 wherein said images have about a 1:1 scale display of a visible scene.

3. The method improving an SCBA according to claim 1 wherein the brightness of the image displayed on the HUD module is adjustable by incorporating ambient light detection circuitry into said TIC module.

4. The method improving an SCBA according to claim 1 wherein said HUD is an electrically switchable LCD reflector which allows viewing of images transferred from said TIC module.

5. The method improving an SCBA according to claim 1 wherein said HUD module incorporates a beam splitter reflector.

6. The method improving an SCBA according to claim 1 wherein the brightness of the image displayed on the HUD module is adjusted automatically by incorporating ambient light detection circuitry into the TIC module or the HUD module.

7. The method improving an SCBA according to claim 1 wherein the brightness of the image displayed on the HUD module is adjusted manually using external buttons on the TIC housing.

8. The method improving an SCBA according to claim 1 wherein said TIC module is removably attached to the SCBA facemask using a key lock to allow exchange of the TIC module between SCBA facemasks.

9. The method improving an SCBA according to claim 1 wherein said HUD module displays information received through a wireless connection with the SCBA electronics telemetry system as an overlay on the image from the TIC.

10. The method improving an SCBA according to claim 1 wherein said HUD module will display a graphical representation of a building layout received through a wireless connection with an SCBA system that is equipped with a remote telemetry system.

11. The method improving an SCBA according to claim 1 wherein said HUD module will display a graphical representation of a building layout, the normal TIC-HUD view or alternating layout and normal views through manual selection using a button on the TIC module.

12. The method improving an SCBA according to claim 1 wherein said images are transported, using a wireless means to said SCBA, wherein said SCBA is equipped with a remote telemetry system, said SCBA will transfer said images to said remote telemetry system for the purpose of remote display of said images.

13. A self contained breathing apparatus (SCBA) comprising:

a SCBA facemask constructed and arranged to protect the eyes, nose and mouth of an individual from an external environment, said SCBA facemask having an inner surface and outer surface;

a mounting bracket attached to the outer surface of said SCBA facemask, said mounting bracket having an upper tab and a lower tab;

a Thermal-Imaging Camera (TIC) module releasably secured to said mounting bracket, said TIC module having an upper spring loaded pin operatively associated with said mounting bracket upper tab, and a lower spring loaded pin operatively associated with said mounting bracket lower tab;

a passive optical display module secured to said inner surface of said SCBA facemask with a field of view magnification factor, said passive optical display module having a lens mated to an optical waveguide for wirelessly receiving images through said SCBA facemask from said TIC module positioned on the outer surface of said SCBA facemask;

wherein said SCBA facemask is not altered or breached and said spring loaded pins allows for the transfer of said TIC module and said passive optical display module to other SCBA facemasks without modification to the SCBA facemask seals or front faceplate.

14. The SCBA according to claim 13 wherein said magnification factor of images on said display module is about a 1:1 scale display of a visible scene.

15. The SCBA according to claim 13 wherein said display module is a passive optical display module and an image transferred from said TIC module is transmitted thru the mask faceplate and acquired inside the facemask by said passive optical display module using a lens mated to an optical waveguide/light pipe for viewing on a prismatic reflector.

16. The SCBA according to claim 15 wherein brightness of an image displayed on the passive optical display module is adjustable by ambient light detection circuitry positioned within the external TIC housing.

17. The SCBA according to claim 13 wherein said passive optical display module includes information from the SCBA electronics displayed as an overlay on the image from the TIC.

18. The SCBA according to claim 17 wherein said overlay is a graphical representation of a building layout received through a remote telemetry system.

19. The SCBA according to claim 17 wherein said display can by cycled to display a graphical representation of a building layout or the image received from the TIC.

* * * * *